US007673316B2

(12) United States Patent
Incentis Carro

(10) Patent No.: US 7,673,316 B2
(45) Date of Patent: *Mar. 2, 2010

(54) SYSTEM AND METHOD FOR ENHANCING BROADCAST PROGRAMS WITH INFORMATION ON THE WORLD WIDE WEB

(75) Inventor: Fernando Incentis Carro, Valencia (ES)

(73) Assignee: Yahoo! Inc., Sunnyvale, CA (US)

( * ) Notice: Subject to any disclaimer, the term of this patent is extended or adjusted under 35 U.S.C. 154(b) by 1239 days.

This patent is subject to a terminal disclaimer.

(21) Appl. No.: 10/477,865

(22) PCT Filed: Apr. 11, 2002

(86) PCT No.: PCT/EP02/04952

§ 371 (c)(1),
(2), (4) Date: Oct. 31, 2003

(87) PCT Pub. No.: WO02/091228

PCT Pub. Date: Nov. 14, 2002

(65) Prior Publication Data

US 2004/0139469 A1    Jul. 15, 2004

(30) Foreign Application Priority Data

May 10, 2001   (EP)   ................................. 01480034

(51) Int. Cl.
*G06F 3/00* (2006.01)
(52) U.S. Cl. ........................... 725/51; 725/112; 725/91; 725/110; 709/203; 709/217; 709/231
(58) Field of Classification Search ................... 725/91, 725/110, 112, 51
See application file for complete search history.

(56) References Cited

U.S. PATENT DOCUMENTS

| 4,977,455 | A | 12/1990 | Young |
| 5,119,507 | A | 6/1992 | Mankovitz |
| 5,189,630 | A | 2/1993 | Barstow et al. |
| 5,262,860 | A | 11/1993 | Fitzpatrick et al. |
| 5,621,793 | A | 4/1997 | Bednarek et al. |

(Continued)

FOREIGN PATENT DOCUMENTS

| EP | 1 089 566 A | 4/2001 |
| WO | WO 02 19719 A | 3/2002 |

OTHER PUBLICATIONS

International Search Report for PCT/EP02/04952, Nov. 7, 2002.

(Continued)

*Primary Examiner*—Hunter B. Lonsberry
*Assistant Examiner*—Nnenna N Ekpo
(74) *Attorney, Agent, or Firm*—Seth H. Ostrow; Ostrow Kaufman & Frankl LLP

(57) ABSTRACT

The present invention is directed to a system and method for viewer real-time access complementary information related to a broadcast program including selecting a plurality of topics drawing his or her attention and for accessing additional information related to these topics from the WWW. The system is based on a synchronization of the local times of receivers and transmitters according to a same universal-time. The synchronization uses a universal time such as the Global Positioning System Time, the Global Orbiting Navigational Satellite System time or others GPS or GLONASS receivers may be integrated or connected to devices independent or separate from the radio or television receivers. The system includes associated with the transmitted information and can be retrieved, selected and activated during the time intervals for which they have been defined.

15 Claims, 18 Drawing Sheets

Main components of the Invention

U.S. PATENT DOCUMENTS

| | | | |
|---|---|---|---|
| 5,640,452 A | | 6/1997 | Murphy |
| 5,703,795 A | * | 12/1997 | Mankovitz .................. 715/721 |
| 5,761,606 A | | 6/1998 | Wolzien |
| 5,774,664 A | * | 6/1998 | Hidary et al. ................ 725/110 |
| 5,778,181 A | | 7/1998 | Hidary et al. |
| 5,818,441 A | | 10/1998 | Throckmorton et al. |
| 5,818,935 A | | 10/1998 | Maa |
| 5,832,223 A | | 11/1998 | Hara et al. |
| 5,841,978 A | | 11/1998 | Rhoads |
| 5,929,849 A | | 7/1999 | Kikinis |
| 5,929,850 A | | 7/1999 | Broadwin et al. |
| 5,961,603 A | | 10/1999 | Kunkel et al. |
| 5,973,685 A | | 10/1999 | Schaffa et al. |
| 5,982,445 A | | 11/1999 | Eyer et al. |
| 5,987,509 A | | 11/1999 | Portuesi |
| 6,018,764 A | | 1/2000 | Field et al. |
| 6,018,768 A | | 1/2000 | Ullman et al. |
| 6,025,837 A | * | 2/2000 | Matthews et al. ........... 715/721 |
| 6,058,430 A | | 5/2000 | Kaplan |
| 6,061,719 A | | 5/2000 | Bendinelli et al. |
| 6,073,171 A | | 6/2000 | Gaughan et al. |
| 6,075,568 A | | 6/2000 | Matsuura |
| 6,076,104 A | | 6/2000 | McCue |
| 6,097,441 A | | 8/2000 | Allport |
| 6,098,106 A | | 8/2000 | Philyaw et al. |
| 6,125,172 A | | 9/2000 | August et al. |
| 6,895,126 B2 | * | 5/2005 | Di Bernardo et al. ....... 382/284 |
| 7,552,193 B2 | * | 6/2009 | Carro ......................... 709/217 |
| 2002/0012290 A1 | * | 1/2002 | Shinagawa .................. 368/21 |

OTHER PUBLICATIONS

International Preliminary Examination Report for PCT/EP02/04952, Dec. 27, 2002.

Davis, "Rivalries, technologies confuse set-top market," Jun. 17, 1999, c/net news.com.

Chapman, "Technology: Will interactive internet television become a two-headed monster?", the Nando Times, Mar. 29, 2001.

* cited by examiner

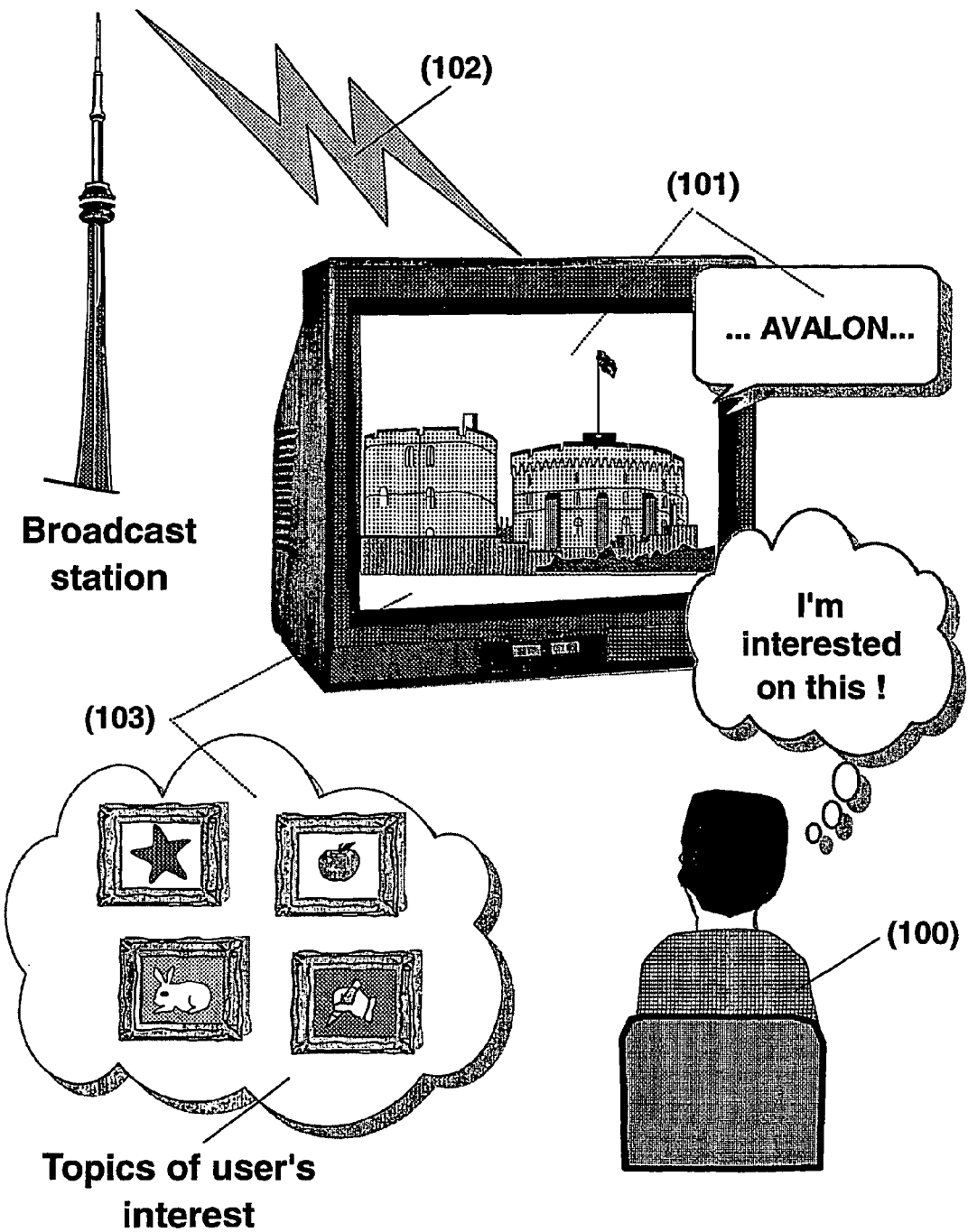
Fig. 1: Perception of interesting topics in a Program by a Television Viewer

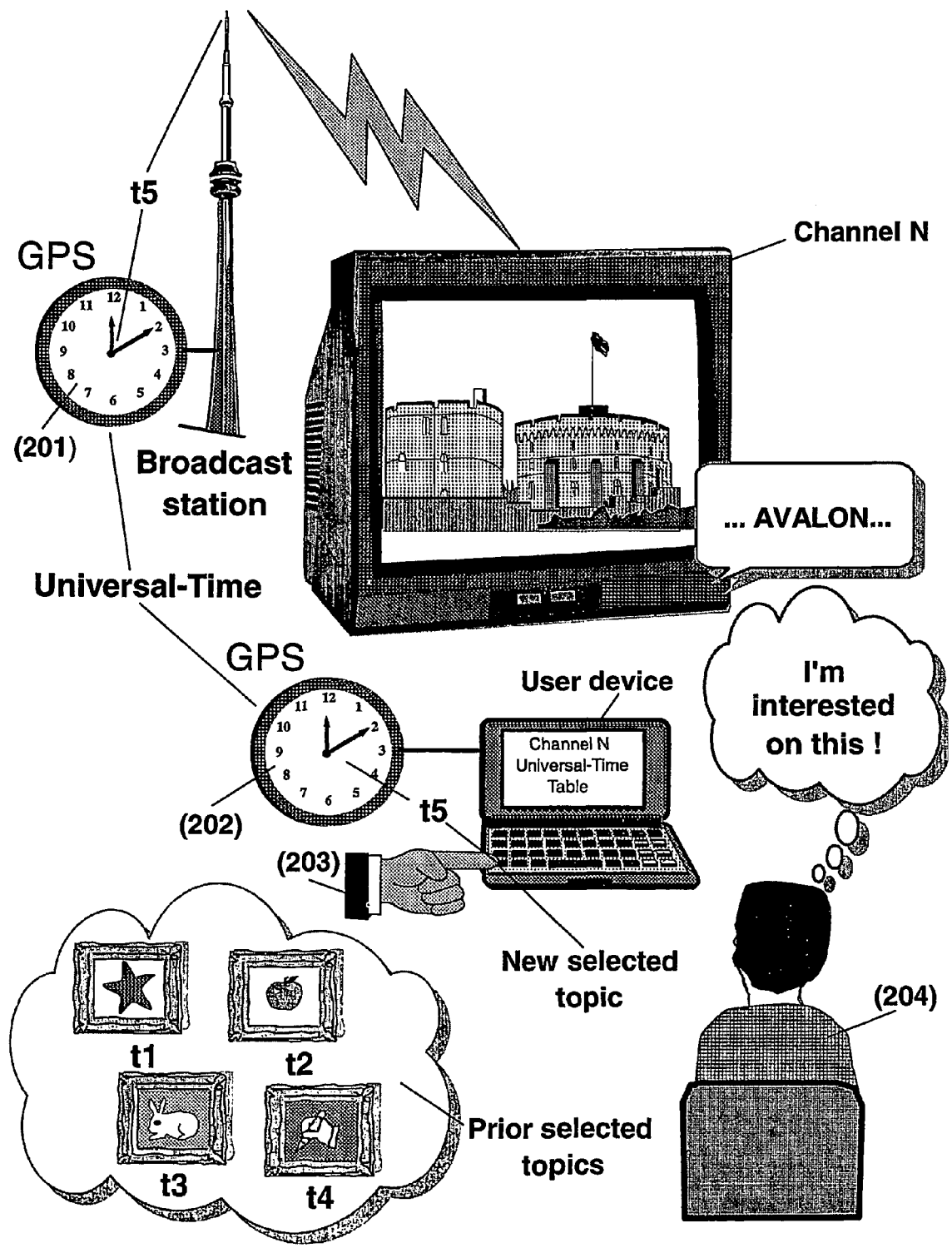
Fig. 2: Selection of interesting topics

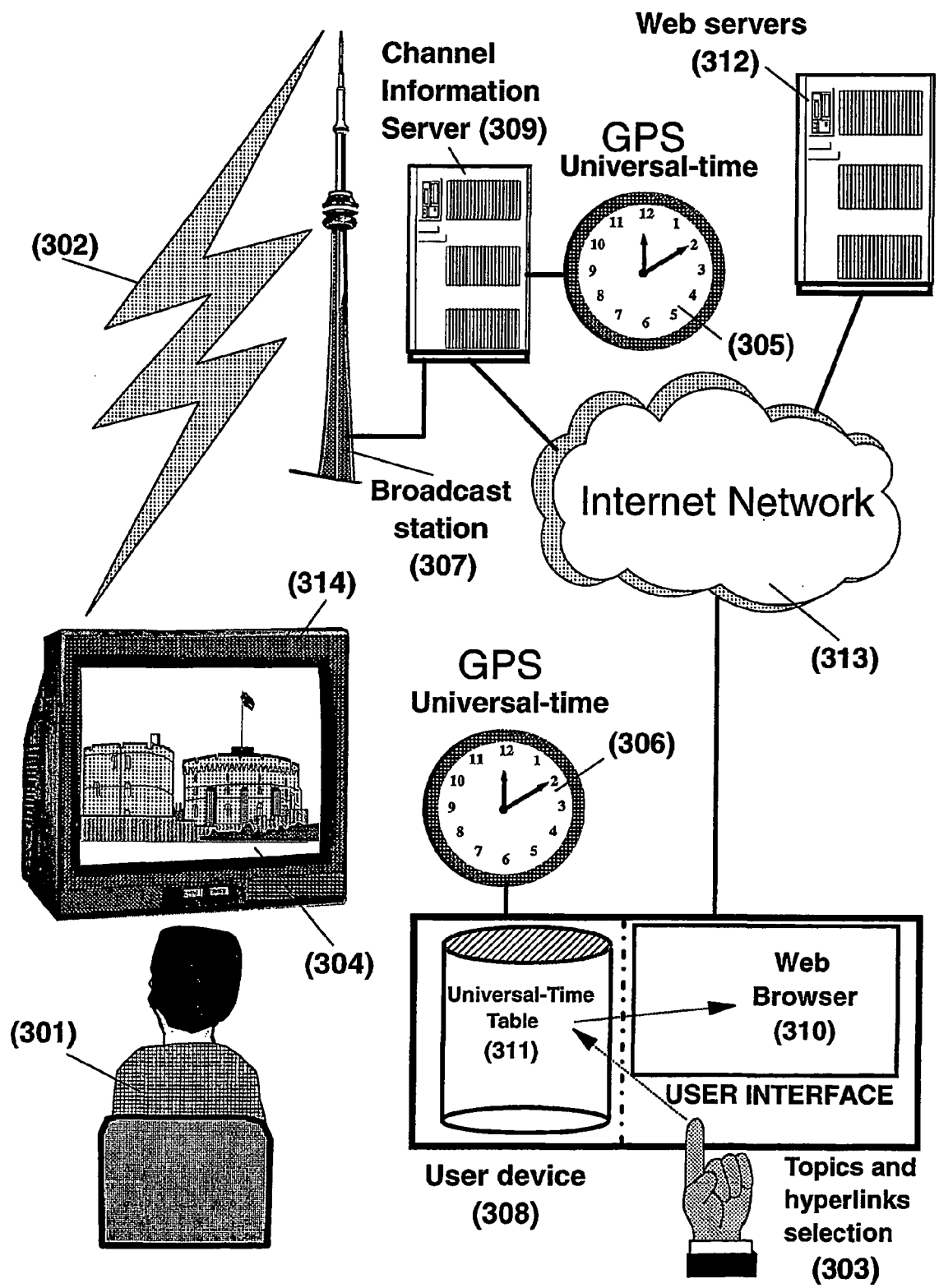
Fig. 3: Main components of the invention

| (402) CHANNEL: 25 | (405) BROADCAST STATION: TV2 | (404) CHANNEL INFORMATION SERVER URL: http:/www.tve2_link.com (401) |
|---|---|---|
| SELECTION TIMES (GPS): | LINK NAME: | LINK URL: |
| 12/05/2000 14:21:52 | | |
| 12/05/2000 15:09:03 | | |
| 12/05/2000 15:17:34 | | |
| | | |
| | | |
| | | |
| | | |
| | (403) | |

Fig. 4 : Universal-Time Table of a Broadcast Channel

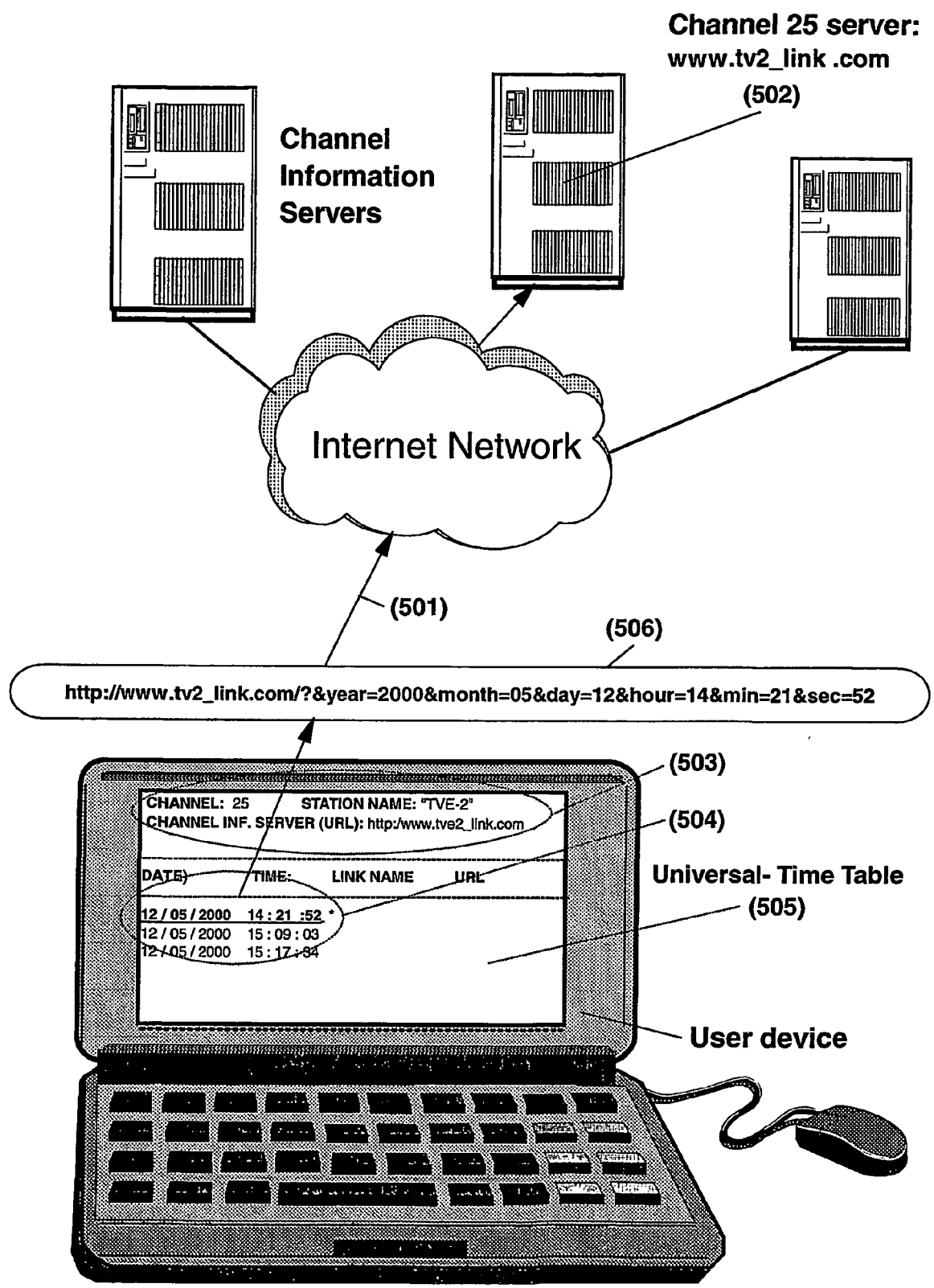
Fig. 5: Sending a selection from the Universal-Time Table to the Channel Information Server

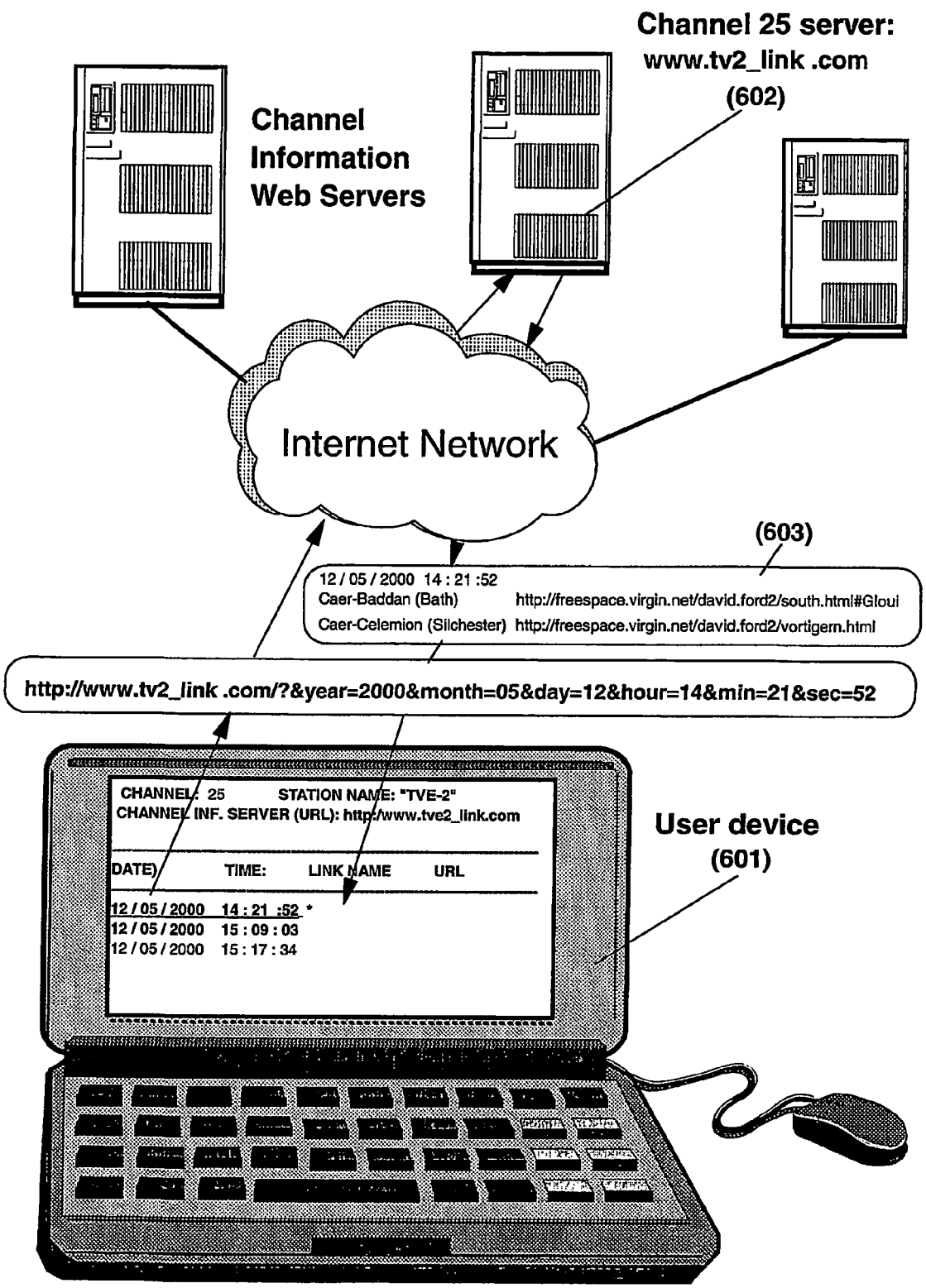
Fig. 6: Retrieving names and URLs of hyperlinks that can be activated at selected universal-time

| CHANNEL: 25 | BROADCAST STATION: TV2 | CHANNEL INFORMATION SERVER URL: http:/www.tve2_link.com |
|---|---|---|
| SELECTION TIMES (GPS): | LINK NAME: | LINK URL: |
| 12/05/2000 14::21:52 | Caer-Baddan (Bath) Caer-Celemion (Silchester) | http://freespace.virgin.net/david.ford2/south.html#Gloui http://freespace.virgin.net/david.ford2/vortigern.html |
| 12/05/2000 15:09:03 | Avalon Afallach | http://freespace.virgin.net/david.ford2/avalon.html http://freespace.virgin.net/david.ford2/gods.html#Afallach |
| 12/05/2000 15:17:34 | The Kings of Dumnonia | http://freespace.virgin.net/david.ford2/dumnonia.html |
| | | |
| | | |
| | | |
| | | |

(702) (701)

Fig. 7: Updated Universal-Time Table

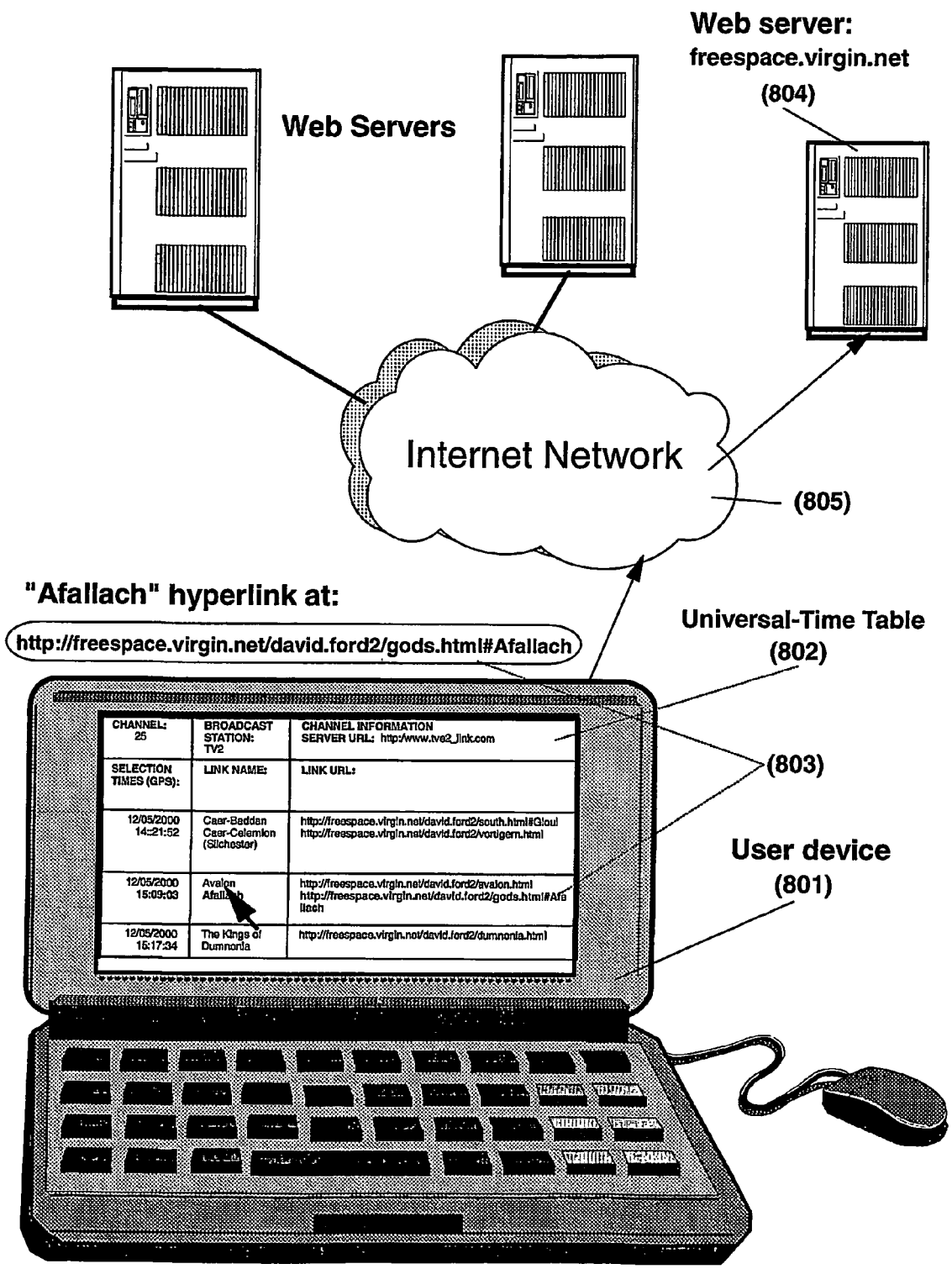
Fig. 8: Selection and Activation of an Hyperlink from the Universal-Time Table

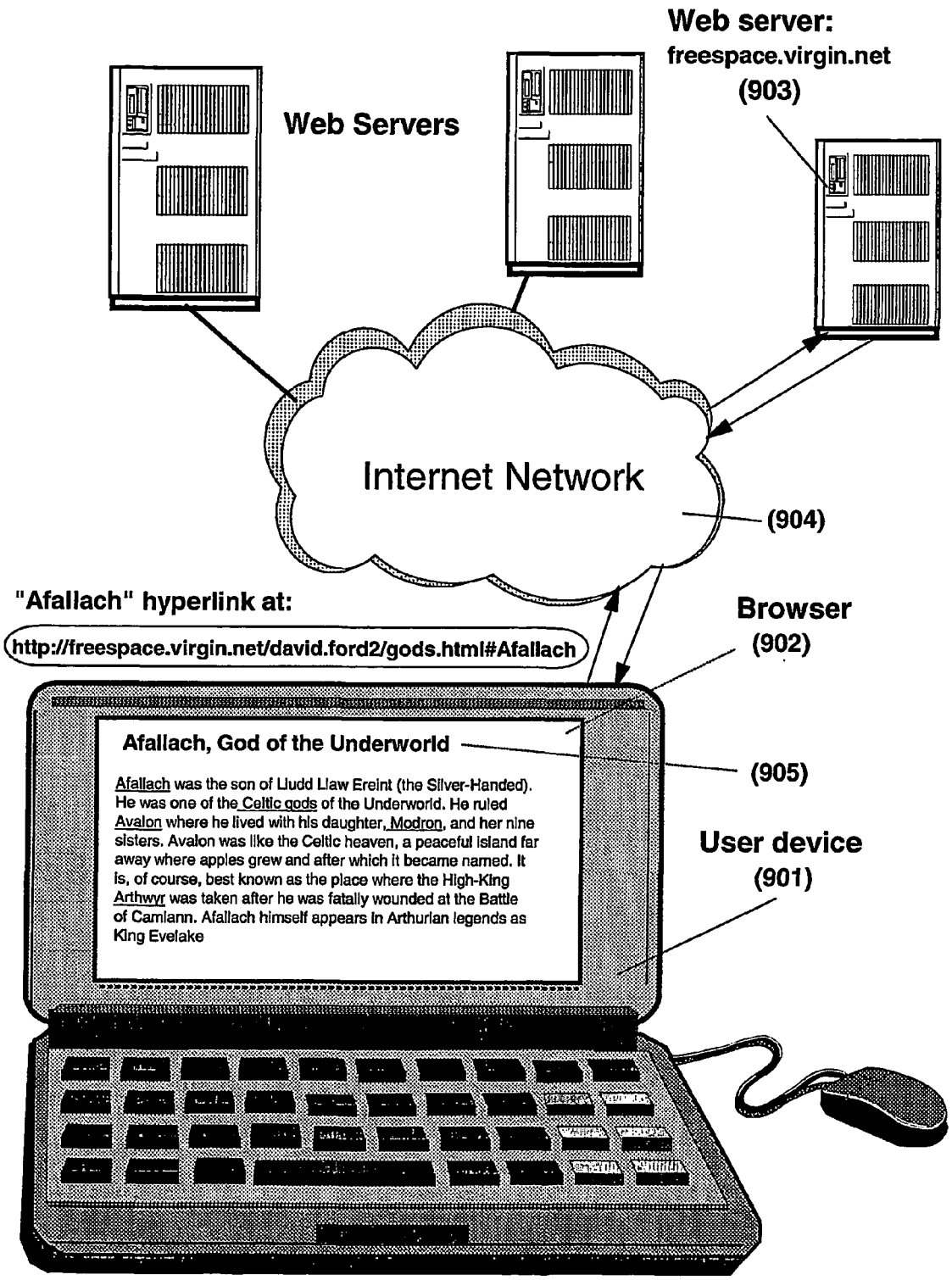
Fig. 9: Access to Information corresponding to Selected Hyperlink

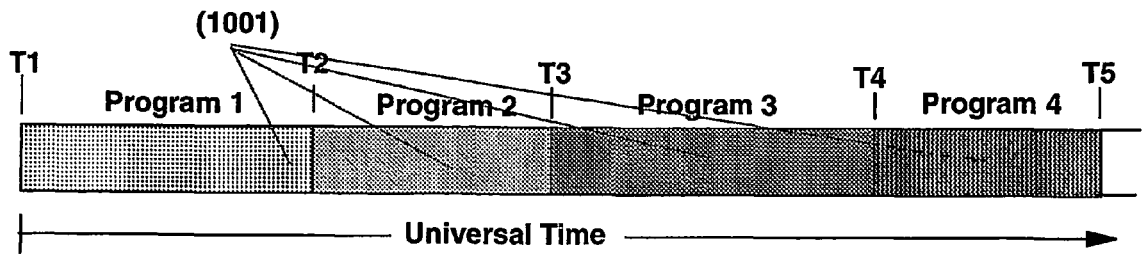
Fig. 10: Synchronization of Programs according to universal-time referrenced intervals
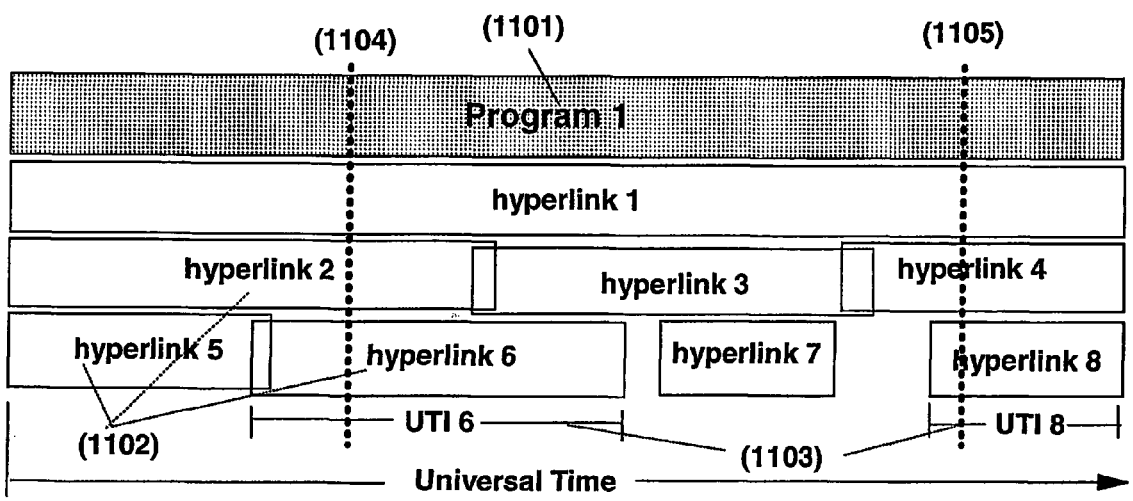
Fig. 11: Hyperlinks defined for the broadcast program during universal-time intervals
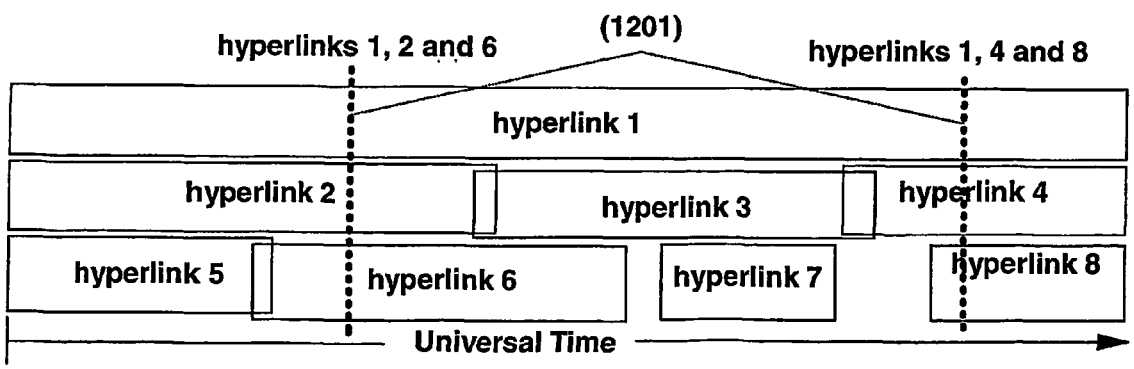
Fig. 12: Selection of hyperlinks at different universal-times during reception of the program

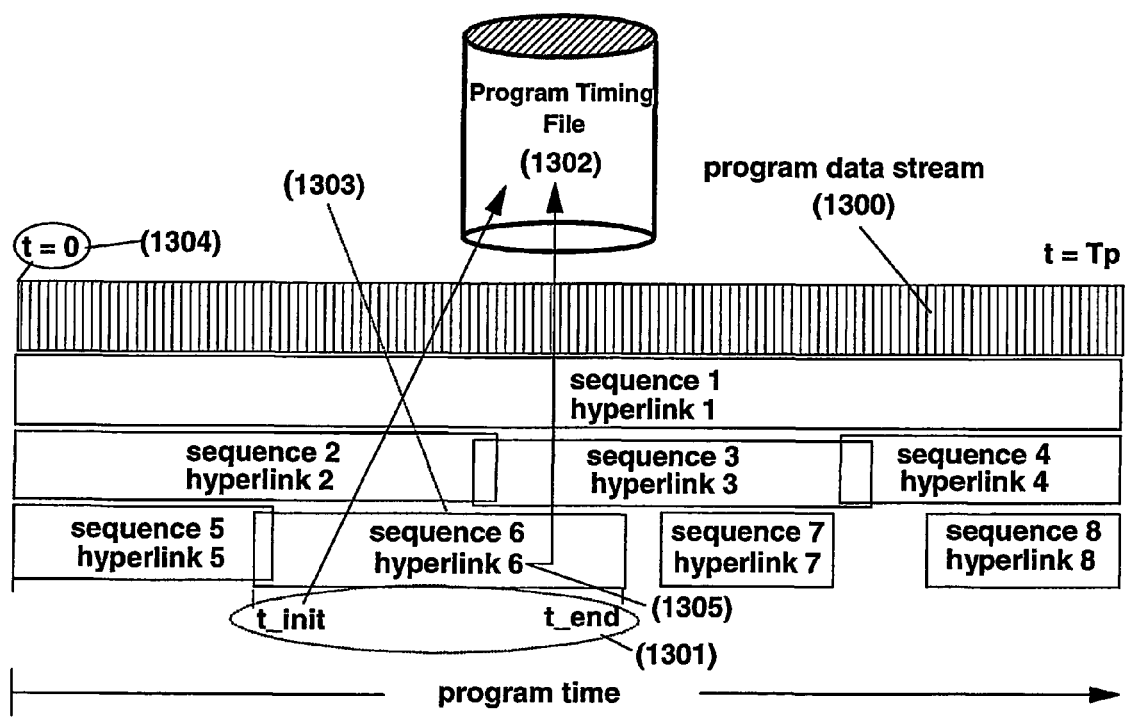
Fig. 13: Program Timing File of a program (1402) 4.587 secs. (1401)

| PROG TIME | | PROGRAM NAME: "Early British Kingdoms" | PROGRAM URL: http://freespace.virgin.net/ |
|---|---|---|---|
| From (sec): | To (sec): | Link Name: | URL: |
| 0 | 596 | Buellt & Gwerthrynion | http://freespace.virgin.net/david.ford2/buellt.html |
| 536 | 721 | Caer-Baddan (Bath) | http://freespace.virgin.net/david.ford2/south.html#Gloui |
| 566 | 1.715 | Caer-Celemion (Silchester) | http://freespace.virgin.net/david.ford2/vortigern.html |
| 1.535 | 2.092 | Ceredigion | http://freespace.virgin.net/david.ford2/ceredigion.html |
| 1.535 | 2.452 | Mabinogion | http://www.cyberphile.co.uk/~taff/taffnet/mabinogion/mabinogion.hm |
| 2.392 | 3.597 | Avalon | http://freespace.virgin.net/david.ford2/avalon.html |
| 3.537 | 4.037 | Afallach | http://freespace.virgin.net/david.ford2/gods.html#Afallach |
| 3.720 | 3.973 | Beli Mawr | http://freespace.virgin.net/david.ford2/gods.html#Beli |
| 3.720 | 3.973 | St.Joseph of Arimathea | http://freespace.virgin.net/david.ford2/joseph.html |
| 3.840 | 4.259 | The Kings of Dumnonia | http://freespace.virgin.net/david.ford2/dumnonia.html |
| 4.199 | 4.587 | Eudaf Hen & Conan Mer | http://freespace.virgin.net/david.ford2/eudanc.html |

(1404) (1405) (1407) (1403) (1406)

Fig. 14: Program Timing File of a program

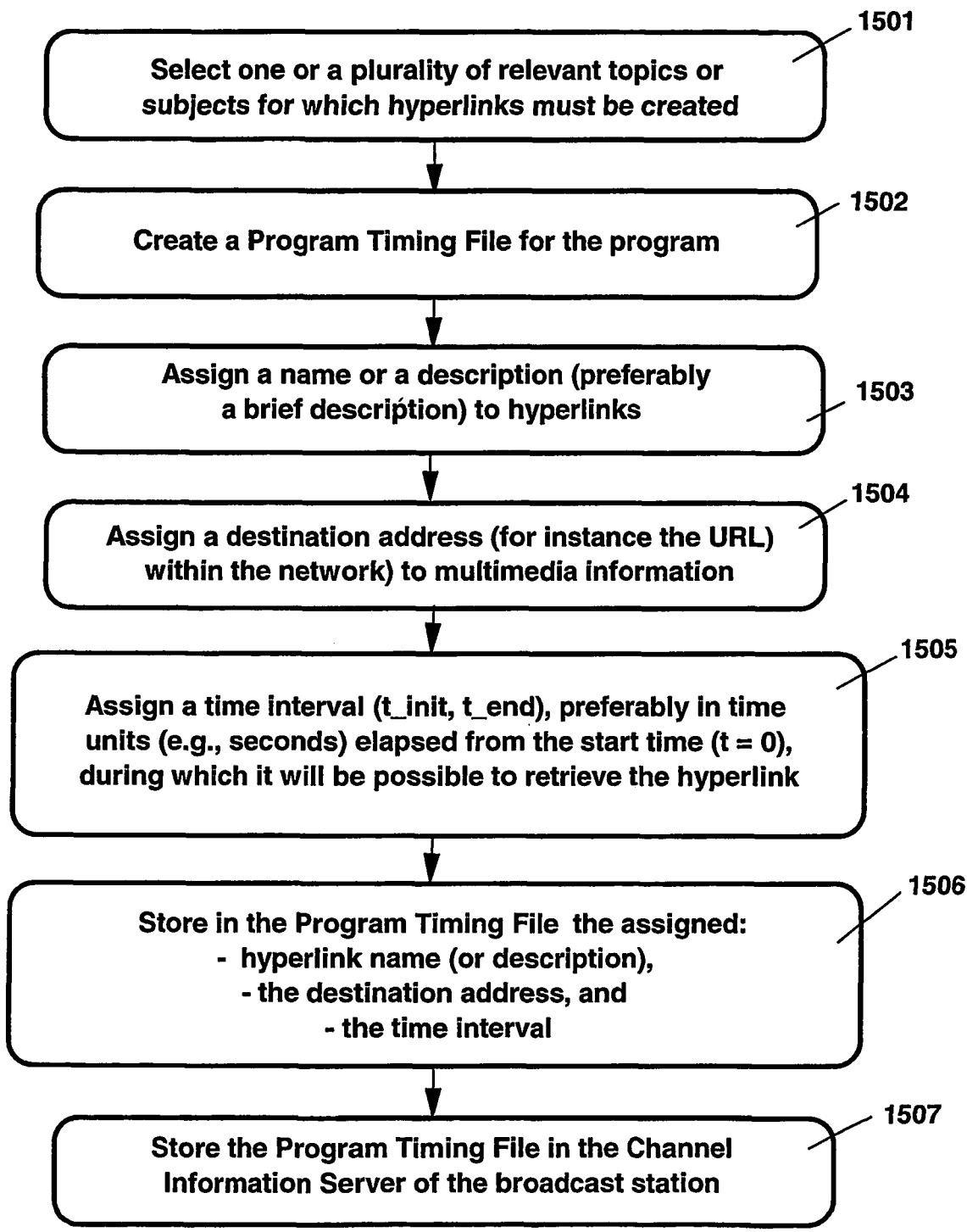
Fig. 15: Method for creating Program Timing Files on servers

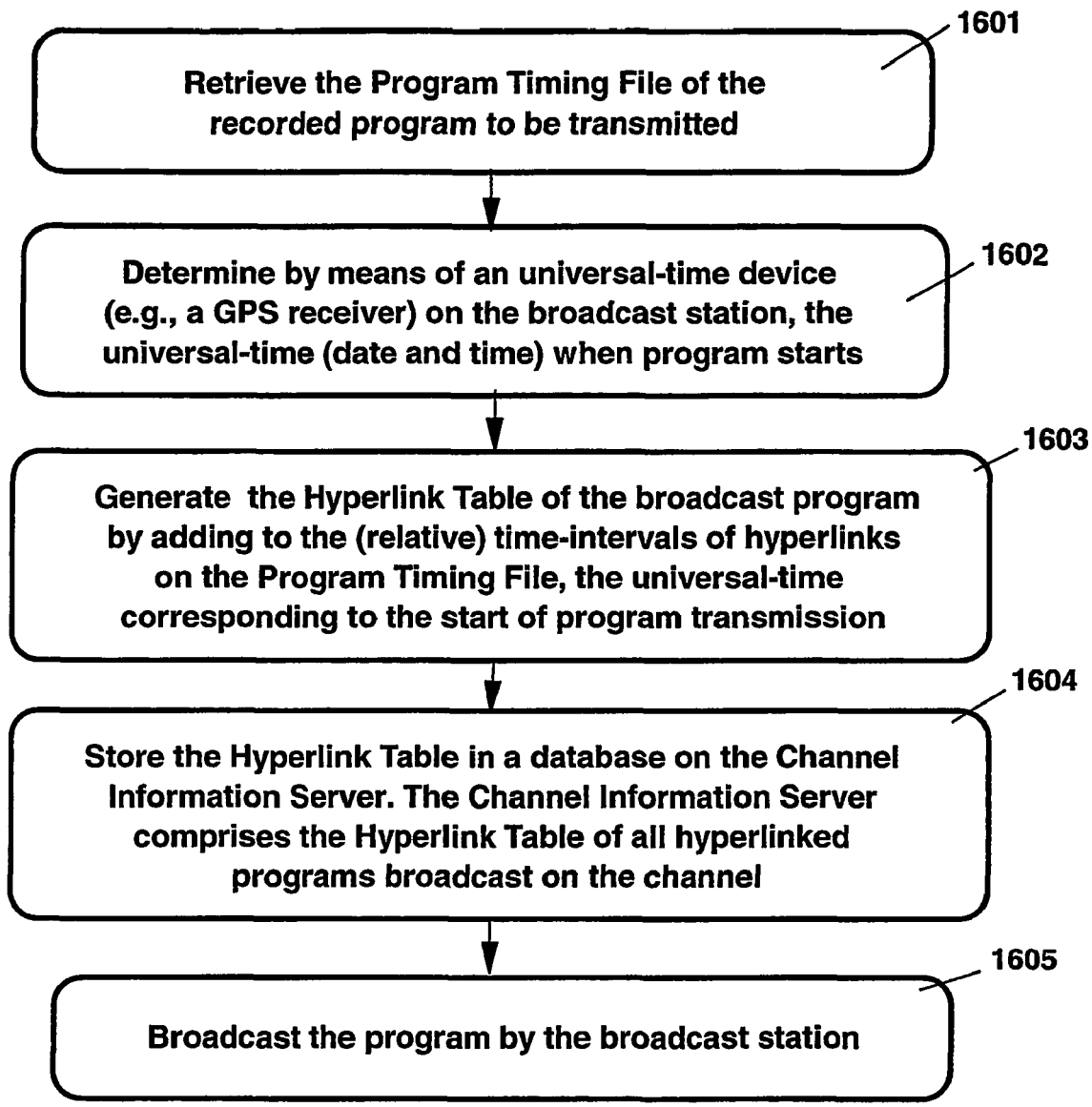
Fig. 16: Method for generating on servers Hyperlink Tables from Program Timing Files

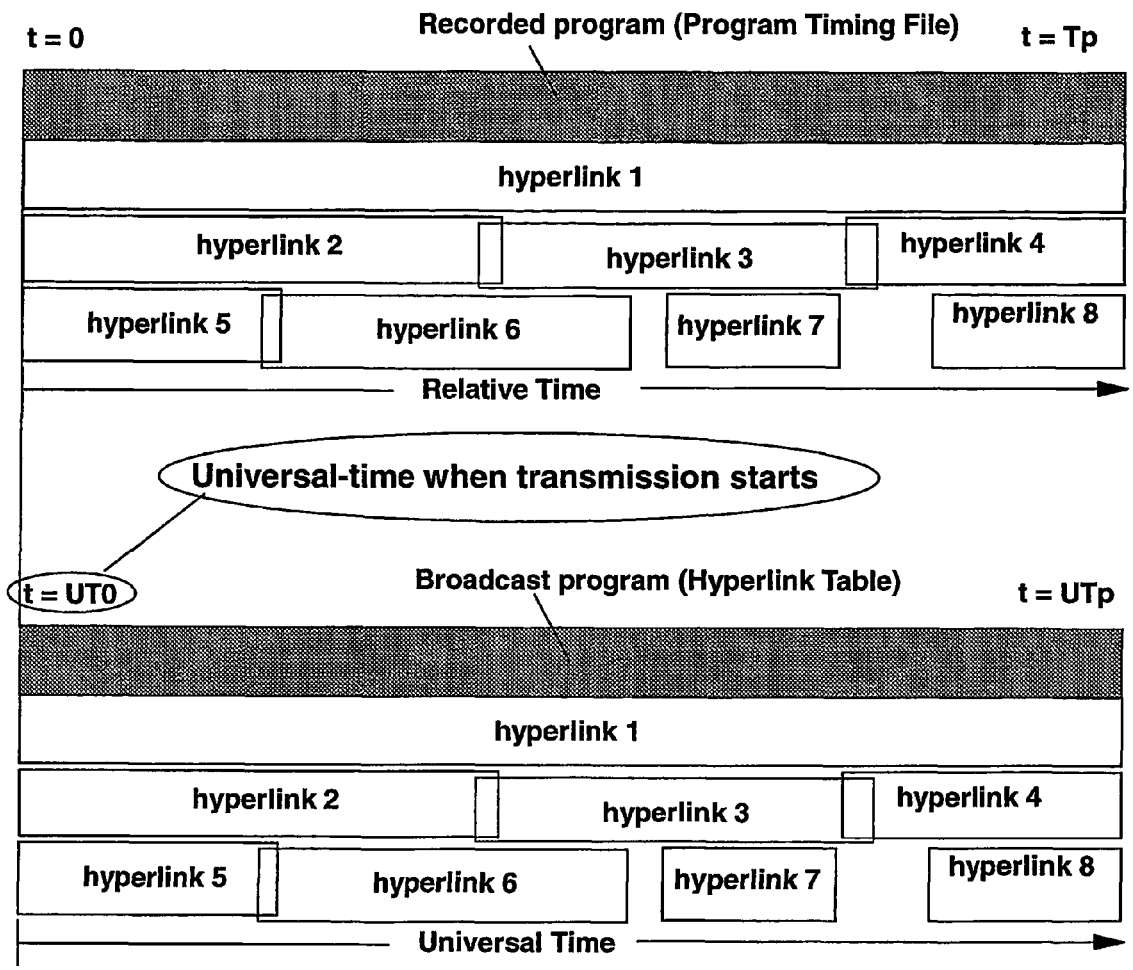
Fig. 17: Transformation of relative time intervals to universal-time referenced intervals at transmission time

| | | PROGRAM NAME: "Early British Kingdoms" | PROGRAM URL: http://freespace.virgin.net/ |
|---|---|---|---|
| FROM: | TO: | LINK NAME: | URL: |
| 12/05/2000 14:10:51 | 12/05/2000 14:20:05 | Buellt & Gwerthrynion | http://freespace.virgin.net/david.ford2/buellt.html |
| 12/05/2000 14:19:05 | 12/05/2000 14:22:52 | Caer-Baddan (Bath) | http://freespace.virgin.net/david.ford2/south.html#Gloui |
| 12/05/2000 14:20:17 | 12/05/2000 14:39:26 | Caer-Celemion (Silchester) | http://freespace.virgin.net/david.ford2/vortigern.html |
| 12/05/2000 14:36:26 | 12/05/2000 14:45:43 | Ceredigion | http://freespace.virgin.net/david.ford2/ceredigion.html |
| 12/05/2000 14:36:26 | 12/05/2000 14:51:43 | Mabinogion | http://www.cyberphile.co.uk/~taff/taffnet/mabinogion/mabinogion.htm |
| 12/05/2000 14:50:43 | 12/05/2000 15:10:48 | Avalon | http://freespace.virgin.net/david.ford2/avalon.html |
| 12/05/2000 15:09:48 | 12/05/2000 15:18:08 | Afallach | http://freespace.virgin.net/david.ford2/gods.html#Afallach |
| 12/05/2000 15:12:51 | 12/05/2000 15:16:22 | Beli Mawr | http://freespace.virgin.net/david.ford2/gods.html#Beli |
| 12/05/2000 15:12:51 | 12/05/2000 15:16:22 | St.Joseph of Arimathea | http://freespace.virgin.net/david.ford2/joseph.html |
| 12/05/2000 15:14:51 | 12/05/2000 15:20:08 | The Kings of Dumnonia | http://freespace.virgin.net/david.ford2/dumnonia.html |
| 12/05/2000 15:19:08 | 12/05/2000 15:25:36 | Eudaf Hen & Conan Mer | http://freespace.virgin.net/david.ford2/eudanc.html |

Fig. 18: Hyperlink Table of the broadcast program in the Channel Information Server

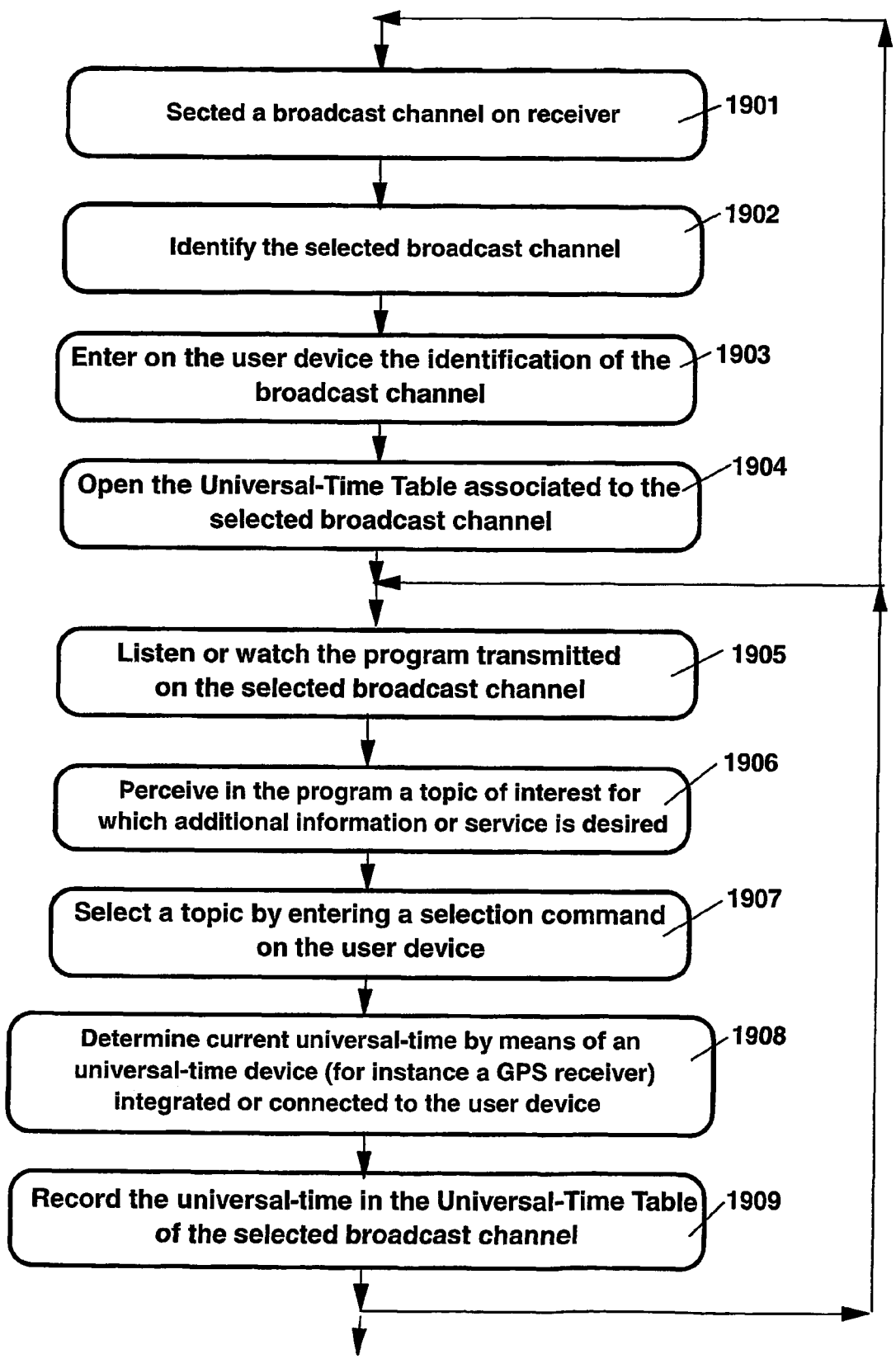
Fig. 19: Method for selecting interesting topics in a program

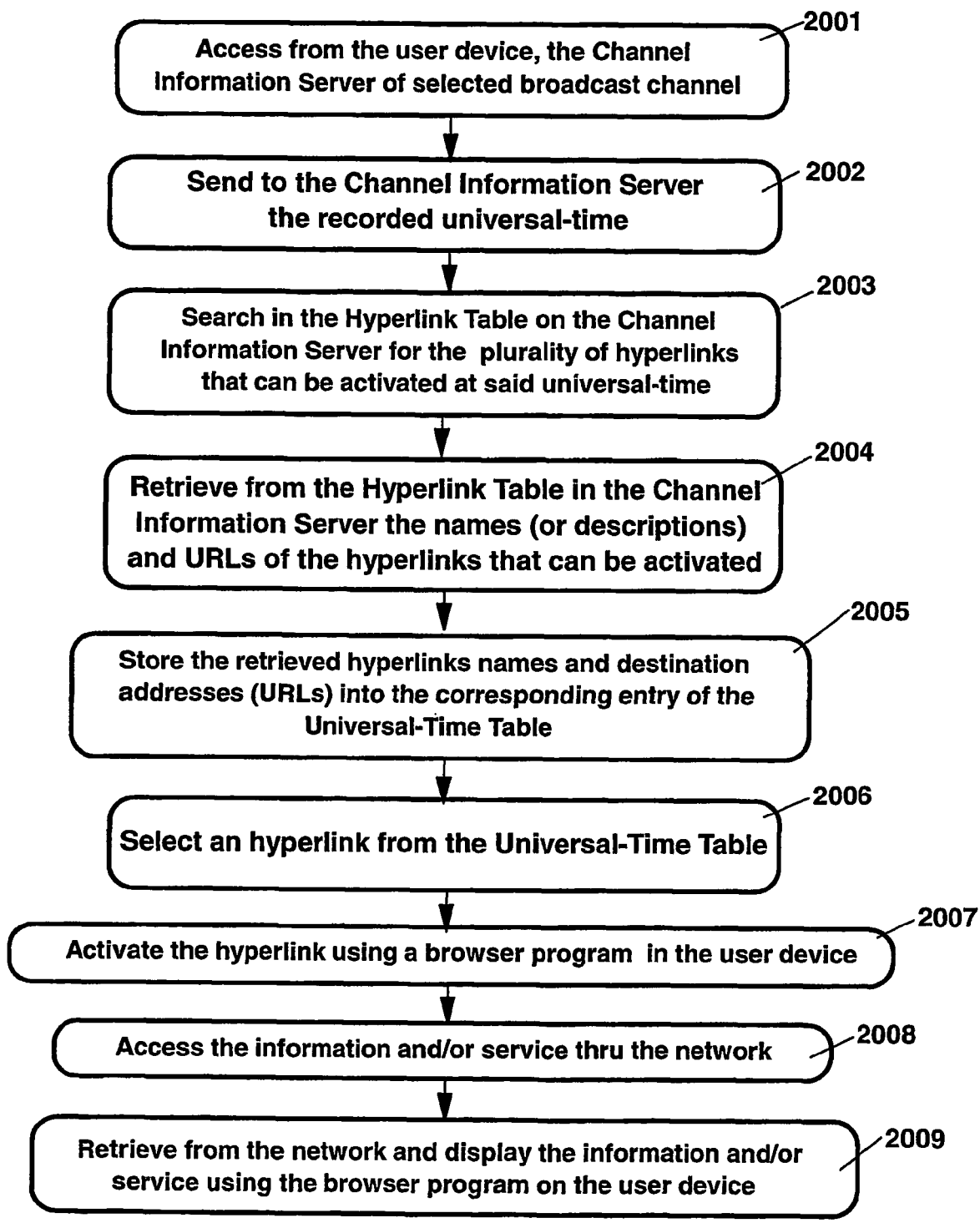
Fig. 20: Method for accessing information related to selected topics

SYSTEM AND METHOD FOR ENHANCING BROADCAST PROGRAMS WITH INFORMATION ON THE WORLD WIDE WEB

RELATED APPLICATION

This application is a national stage application of and claims priority from PCT Application PCT/EP02/04952, filed Apr. 11, 2002, which claims priority from European Application No. 01480034.6, filed May 10, 2001. These disclosures are hereby incorporated by reference herein in their entireties. The above PCT International Application was published in the English language and has International Publication No. WO 02/091228 A2.

FIELD OF THE INVENTION

The present invention relates generally to techniques for integrating broadcast and computer systems, and more particularly to a system and a method for enhancing radio or television programs, and more generally broadcast programs, with information on the World Wide Web.

BACKGROUND OF THE INVENTION

Broadcasting

Media consumers have a need for additional services. When people watch a television program, they would like to have access to related complementary data, such as stocks and products prices, traffic and weather conditions, athletic records on Olympic Games or updated football scores. The complementary information associated with a broadcast program may consist of the biography of a player in a football match, an historical background on events cited on a news program or the recipe of an apple cake on a cooking show.

On the consumers side, people are looking for more information or data about what they hear or view in the media. Consumers would like to have access to special services associated with advertised products such as product features, location of points of sales, or discounts or coupons.

On the media providers side, new sources of profit are expected by extending the quantity and quality of services and information provided to consumers of television or radio programs. Advertisers are looking for new and more effective forms of advertisement.

To provide these services, the problem with conventional television or radio systems is that the information is continuously broadcast in the same direction from a transmitter to multiple receivers, from a provider to multiple consumers. Communication is limited to only one direction without any exchange of information with consumers. People cannot interact with the programs to seek additional information or services. Because the information is continuously broadcast, most of this information is lost if not memorized or recorded for a later playback.

On-line Services on the Web

In our society, independently of the massive development of radio and television, on-line services such as those provided by the World Wide Web (i.e., the Web) have rapidly emerged and are now widely available. Such on-line services based on the Internet provide access to a huge amount of information on an interactive basis. The Internet is a global network of computers. The Internet connects computers based on a variety of different operating systems or languages using a language referred to as TCP/IP ("Transmission Control Protocol/Internet Protocol"). With the increasing size and complexity of the Internet, tools have been developed to help find information on the network, often called "navigators" or "navigation systems". The World Wide Web ("WWW" or "the Web") is a recent superior navigation system. The Web is:

an Internet-based navigation system,
an information distribution and management system for the Internet, and
a dynamic format for communicating on the Web.

The Web integrates images, text, audio and video. A user on the Web using a graphical user interface can transparently communicate with different computers on the system, and different system applications, and different information formats for files and documents including, for example, text, sound and graphics.

Internet and the Web is transforming our society. They offer to millions of users the opportunity to access and exchange information and to communicate between each other. Currently, on-line systems on the Web offer a variety of different services to users, for instance, private message services, electronic commerce, news, real-time games, access to electronic databases, electronic newsletters, business-to-business transactions, or job placement services. But, even if such on-line services are now available, the searching and finding of the relevant information on the Web remains an arduous task, sometimes taking hours, even for experienced users.

Internet is essentially an open, multi-point to multi-point network, where each user can select and retrieve different information from many different servers. Today, most on-line interactions with the Web occur merely through textual inputs for instance by entering URLs (Uniform Resource Locator) names, by entering search words on search tools, by activating textual hyperlinks on HTML (Hypertext Markup Language) documents. Even if in a near future, the development of audiovisual interfaces (e.g., human speech interfaces, Web-phone integration) will render textual inputs less and less dominant in on-line environments, there is a good chance that the Web remains user unfriendly due to its massiveness, its lack of organization, and its randomness. Simply stated, in the Web there is no order or direction. Information remains most of the time hard to find and, even worse, in a foreseeable future, it will remain a difficult task to find the required information into the desired context.

Interactive Television and WebTV

Today, the Web continues its expansion in the mass media as indicated by the fact that Internet addresses are shown up regularly in commercials. The use of television sets as terminals for accessing the Web is increasing every year. A trend due to this development is the integration of Web and TV by transmitting along with a video signal a Web page showing for example statistics concerning a player during a sports game. The integration of Web and television, known as WebTV has been made possible by the arrival of digital TV. The data processing technology and the transmission technology used for the television and the Web are converging. Now TV sets are more and more "intelligent", and this intelligence requires the upgrading of hardware in particular for supporting the Web functions. In fact, many of the services associated with WebTV are available today on the Web.

The most obvious trend for the Web on television (i.e., the WebTV) is to integrate the Web in the broadcast and cable television. The most important point of design is to know what program the user is watching. In this regard today, WebTV works with selected television producers to provide hyperlinks during programs or commercials. These hyperlinks are used to access additional information concerning the television programs through the WebTV service.

In the effort for converging interactive services and media, a consortium of communication companies promotes a set of standards for interactive television and WebTV known as "enhanced television". For example, the Advanced Television Enhancement Forum (ATVEF) is a cross-industry alliance of companies in the field of cable networks, radio and television, consumer electronics, and personal computers. This alliance of companies has defined some protocols for a television based on the Hypertext Markup Language (HTML) to allow content creators to deliver enhanced programs over all forms of transport (analog, digital, cable, and satellite) to any "intelligent" receiver. The ATVEF group is committed to accelerate the creation and distribution of enhanced television programs so that consumers can receive programs in the least expensive and most convenient possible way. Details on the ATVEF are available at: atvef.com.

Despite its considerable support (e.g., Disney, CNN, NBC, Intel, Deutsche Telecom, Nokia, iXL, set-top boxes manufacturer Pace Micro, and Microsoft, among other), the ATVEF standards are not the only standards for interactive television and WebTV. A wide array of standards such as the U.S.-based Advanced Television Systems Committee and Digital Video Broadcasting in Europe are looking into issues such as, for example, how to advance TV through the use of Sun Microsystem's Java language. Sun Microsystems who owns the OpenTV, is among these who haven't signed on to ATVEF standards, in contrast with Microsoft, one of the founders of the ATVEF effort. OpenTV is emphasizing the use of Java in television systems to address the issue of making enhanced TV services available across multiple devices. While ATVEF focuses on the display of content on multiple platforms, JavaTV, the software sponsored by OpenTV, focuses on hardware compatibility.

There are other standardization efforts which can potentially have an effect on the market. For example CableLabs, the industry's research consortium, attempts to set hardware and software standards to enable the execution of applications on any platform. W3C, the Internet User's Consortium, has initiated a forum involving the television community and the Internet community. The theme is "Real-Time Multimedia and the Web". The technologies that may be adopted by the ATT company may also influence the future market trends.

With so many ongoing initiatives, the problem is that today many people in the broadcast industry don't really know which direction the market is going. Quoting Jonathan Taplin, Intertainer's co-chief executive: "We believe the history of interactive TV is just about to be written. What we need is a common language to write to".

Also, in an article on Jun. 17, 1999, on CNET News.com, entitled "Rivalries, technologies confuse set-top market", Jim Davis summarized the situation as follows: "Despite the homilies and Industrial Age metaphors espoused at a big cable convention here, (in Chicago) many roadblocks still stand in the way of mass use of the new TV set-top boxes, interactive television, and other services".

More recently, articles like the one entitled: "Will interactive internet television become a two-headed monster?", by Gary Chapman, published on the Technology section of the Tribune Media Services, Copyright © 2001 Nando Media, Copyright © 2001 Los Angeles Times Syndicate, dated on Mar. 29, 2001, on: nandotimes.com/technology/story/0, 1643,500468156-500716006-503964418-0,00.html illustrates this endless debate, turmoil and lack of consensus about the future directions of WebTV and, the confusion that today exists about how in the future interactive services and media may converge.

Providing On-line Services on Television or Radio

Unlike the multi-point to multi-point Web network, radio or television are primarily single-point to multi-point networks. Every user receives the same content from a single broadcasting station. The main problem is to provide "two-way" web-like capabilities in a conventional (non-interactive) broadcast system. Until today, most television and radio receivers were linked to interactive information providers in a very limited way, briefly described hereinafter.

Nowadays, many television and radio broadcasters display an Internet address to make inquiries concerning the program that is retransmitted. Accessing the Internet requires a computer. The user must manually enter the Internet address in the computer. Some other systems allow the exchange of digital information with the viewer by combining this information with the television signal. However, such systems limits the access to a single information source and this source is entirely under the control of the broadcast or cable television operator.

In fact, until recently, there was no way for producers of television or radio programs to create hyperlinks to access complementary information related to a broadcast program. The systems proposed in this regard require the transmission of the complementary information in a secondary signal, concurrently with the retransmission of the main program. The radio auditors or television viewers must be equipped with special decoder circuits for recovering this information. Other proposals are based on transmitting identification of television programs or URLs of hyperlinked information associated to television programs during the vertical blanking interval (VBI) period. Special decoders are also needed to use such methods.

Television closed captions are captions that are hidden in the television video signal, invisible without a special decoder. The place where they are hidden is called line 21 of the vertical blanking interval (VBI). A law in the United States called the Television Decoder Circuitry Action of 1990 requires since July 1993, that all televisions manufactured for sale in the U.S. contain a built-in caption decoder if the television picture tube is 13" or larger. TELETEXT or Super-text captions for the hearing impaired are commonly transmitted by this means. A tutorial of Vertical Blanking Interval (VBI) systems, is available on: msc-smc.ec.gc.ca/nwsd/awps/vbinfo_e.cfm. A specification on how to send URLs over Line21 VBI, has been published by the Computer and Electronics Marketing Association (CEMA), USA.

U.S. Pat. No. 6,125,172 entitled "Apparatus and method for initiating a transaction having acoustic data receiver that filters human voice", U.S. Pat. No. 6,098,106 entitled "Method for controlling a computer with an audio signal" or U.S. Pat. No. 5,119,507 entitled "Receiver apparatus and methods for identifying broadcast audio program selections in a radio broadcast system", disclose systems and methods for embedding information into audio signals.

U.S. Pat. No. 6,097,441 entitled "System for dual-display interaction with integrated television and Internet content", U.S. Pat. No. 6,075,568 entitled "Apparatus of storing URL information transmitted via vertical blanking interval of television signal", U.S. Pat. No. 6,058,430 entitled "Vertical blanking interval encoding of Internet addresses for integrated television/internet devices", U.S. Pat. No. 6,018,768 entitled "Enhanced video programming system and method for incorporating and displaying retrieved integrated Internet information segments", U.S. Pat. No. 5,818,441 entitled "System and method for simulating two-way connectivity for one way data streams", and U.S. Pat. No. 5,761,606, entitled "Media online services access via address embedded in video or audio program" disclose various systems and methods based on the transmission of the information in the vertical blanking interval (VBI) for analog signals, or in dedicated slots for digital signals, according to protocols such as MPEG.

Different systems and methods for embedding hyperlinks or for encoding information into the same images or on selected portions of images have been disclosed for instance in U.S. Pat. No. 6,076,104 entitled "Video data Integration system using image data and associated hypertext links", U.S. Pat. No. 6,061,719 entitled "Synchronized presentation of television programming and web content", U.S. Pat. No. 6,018,764 entitled "Mapping uniform resource locators to broadcast addresses in a television signal", U.S. Pat. No. 5,987,509 entitled "System and method for displaying active uniform network resource locators during playback of a media file or media broadcast", U.S. Pat. No. 5,973,685 entitled "Scheme for the distribution of multimedia follow-up information", U.S. Pat. No. 5,841,978 entitled "Network linking method using steganographically embedded data objects", U.S. Pat. No. 5,832,223 entitled "System, method and device for automatic capture of Internet access information in a broadcast signal for use by an Internet access device", U.S. Pat. No. 5,818,935 entitled "Internet enhanced video system", U.S. Pat. No. 5,778,181 entitled "Enhanced video programming system and method for incorporating and displaying retrieved integrated Internet information segments", U.S. Pat. No. 5,262,860 entitled "Method and system communication establishment utilizing captured and processed visually perceptible data within a broadcast video signal", U.S. Pat. No. 5,189,630 entitled "Method for encoding and broadcasting information about live events using computer pattern matching techniques", and U.S. Pat. No. 4,977,455 entitled "System and process for VCR scheduling". In all these patents, the extraction of encoded information requires specialized, dedicated decoders or TV set-top boxes.

Different interaction systems and methods by means of two-way communication protocols for web televisions (WebTVs), interactive television and channel-hyperlinking, using dedicated specialized hardware (e.g., using a television set-top box) and specialized software are disclosed for instance in U.S. Pat. No. 6,073,171 entitled "Two-way communication protocol for a web television", U.S. Pat. No. 5,982,445 entitled "Hypertext markup language protocol for television display and control", U.S. Pat. No. 5,961,603 entitled "Access system and method for providing interactive access to an information source through a networked distribution system", U.S. Pat. No. 5,929,850 entitled "Interactive television system and method having on-demand web-like navigational capabilities for displaying requested hyper-linked web-like still images associated with television content", and U.S. Pat. No. 5,929,849 entitled "Integration of dynamic universal resource locators with television presentation".

A rather different method for enabling an auditor or a viewer to access additional information related to both radio and television programs, based on the general principle of using the reception time of a broadcast program to obtain supplemental information is disclosed in U.S. Pat. No. 5,703,795 entitled "Apparatus and methods for accessing information relating to radio and television programs" (Mankowitz). In order to clearly distinguish U.S. Pat. No. 5,703,795 from the present invention, as well as for providing a point of departure for analyzing the other types of systems of the prior art, essential features of U.S. Pat. No. 5,703,795 will be discussed in detail.

Basically, U.S. Pat. No. 5,703,795 discloses and apparatus and method for ordering supplemental information about programs playing at a broadcast receiver. One embodiment is a method for providing information to a user from an information depository. The method includes the steps of reproducing in the vicinity of each of a plurality of users, programs from one of a plurality of broadcasting stations, recording upon command by a user, an identification of a station and a time of a program on the station for which supplemental information is desired by the user, entering the recorded station identification and time into one of a plurality of information exchange terminals, coupling the information exchange terminal to the information depository to transmit information therebetween; and identifying a correspondence between the entered station identification and time and a program in a station log to obtain the desired supplemental information. The method additionally includes the steps of compiling a station log of stations, program times, and program identifiers for programs on the stations and mapping the program identifiers in the log to supplemental information relating to specific programs.

While U.S. Pat. No. 5,703,795 preferably uses "local times" of transmitters and receivers, the system and method object of the present invention, is based on the use of a common Universal-Time reference for both transmitters and receivers, such as for example the Universal Time Co-ordinated (UTC) time or the Global Positioning System (GPS) time. The principle of the invention is the following: transmitters and receivers must be synchronized by means of a unique Universal-Time reference and timing system independent of the respective location of each transmitter and each receiver. Otherwise, if a receiver is located far from the transmitter (e.g., on a different time-zone), a system using "local times" like the one disclosed in U.S. Pat. No. 5,703,795 will fail without the prior re-synchronization of the receiver to the transmitter. To perform this re-synchronization, the receiver must know in advance the time-zone of the transmitter. The problem is that the time-zone of the transmitter is unknown in some cases. A border case for illustrating this difficulty is the example of a mobile user receiving broadcast programs from different remote broadcasting stations when flying across different time-zones.

As described in U.S. Pat. No. 5,703,795, transmitters (i.e., broadcasting stations) are responsible of synchronizing receivers, for example, by means of audible DTMF (Dual-Tone Multi Frequency) tones broadcast by a local station at each hour of the day. So users can synchronize their receiver using its internal radio circuit or using another radio for detecting the audible tone and resetting the system clock. Alternatively, U.S. Pat. No. 5,703,795 proposes for synchronizing receivers, to download a synchronizing DTMF tone to the receiver via a telephone link. The proposed synchronization mechanism limits the capability of the receiver to be synchronized "at any moment" with the transmitter, independently of sporadic receptions ("a few times each day", or "hourly") of timing signals sent by the transmitters, or by an independent timing authority responsible of synchronizing both, transmitters and receivers. The alternative of making a telephone call for transmitting a synchronization signal involves additional complexity and limits the efficiency and usefulness of the system. Also, under certain realistic circumstances, the reception and decoding of audible timing tones may be unreliable and prone to errors. Unlike U.S. Pat. No.

5,703,795, the system and method according to the present application is based on an Universal-Time timing system, preferably the Global Positioning System (GPS) time, for synchronizing transmitters and receivers. The present invention makes possible that both transmitters and receivers are "always" synchronized according to a same reference time, without the need of a human intervention.

In U.S. Pat. No. 5,703,795, there is no precise definition of the notion of "distance" for selecting a program based on the time recorded by the user. Basically, U.S. Pat. No. 5,703,795 describes a system on which a single selection of a program can be made (i.e., a unique "hyperlink" can be activated during a program), based on the user's selection time. On this system programs are sequential and can be activated on non overlapping time intervals, thus the user is forced to act promptly for correctly selecting an interesting item during the program, before the next program could start. If the program that is being received has a very short duration (e.g., 30 seconds), and the user hesitates or delays by any reason the decision to make a selection, a wrong selection may be made. Thus, with this method, a problem occurs if the next program starts before the user selects the previous program.

Unlike U.S. Pat. No. 5,703,795, the concept of hyperlinks is essential in the present invention, as it will be further discussed. Each program comprises one or a plurality of hyperlinks. Each hyperlink in the program is associated with an hyperlink "start time" and an hyperlink "end time", (i.e., an hyperlink becomes "alive" during a finite universal-time interval) and may be recovered and activated only when the user makes a selection during this time interval. This mechanism takes into account the "temporal fuzziness" effects due to delays on selections and variations on program transmission times. Overlaps of time intervals during which the hyperlinks of the "successive programs" are "alive" are defined and implemented. Even when a user makes a "late" selection, it will still be possible to recover the information associated with the desired interesting topic found on the received program.

In U.S. Pat. No. 5,703,795, only one information at a time, associated with a single selected program can be retrieved from a single transmitter, content producer or operator. Unlike U.S. Pat. No. 5,703,795, the present invention defines and implements overlaps on time of multiple hyperlinks for the same program. The user can retrieve multiple different data, from different information providers, with a single selection. For example, if a user watches a film and, at the time of the selection, the user was watching on the TV receiver a scene played by two actors, by selecting this scene, the user may be "linked" to two different biographies, each one provided by a different Web server (i.e., having different URLs).

Finally, U.S. Pat. No. 5,703,795 basically discloses a proprietary system where information associated with the programs on a broadcast channel is provided by a single source. The information is stored and supplied by a single information provider, such as the broadcast television operator. Unlike U.S. Pat. No. 5,703,795, the present invention discloses an open system for accessing on the Web additional information associated with the radio or television programs the people receive.

Therefore, today there is a need to provide new convenient, universal, and easy mechanisms for enabling people receiving a broadcast television or radio program to effectively select and access complementary information for which they have some interest.

While during the last years, interactive systems have been developed for increasing and improving the level of interaction with users and for providing more information and learning or entertainment opportunities, today, important sources of information such as those we can find in the Web, still remain inaccessible from traditional broadcast systems (i.e., using conventional, one-way, TV and radio broadcast systems and passive TVs and radio receivers). Hence, there is a need for a simple system and method to provide web-like capabilities in a primarily broadcast environment.

In particular, today there is a need for producers to create hyperlinks, from segments or sequences retransmitted on radio or television programs, to relevant data on the Web in such a form that, without physically transmitting these hyperlinks embedded on conventional one-way broadcast signals and thus, without modifying conventional transmitters or receivers, these hyperlinks can be selected by radio auditors or television viewers during the reception of a program and be activated for accessing related information or services throughout the Web.

Moreover, there is a need for a system able to operate independently of the relative positions of receivers and transmitters, without having to synchronize receivers and transmitters.

OBJECTS OF THE INVENTION

It is a broad object of the invention to integrate conventional non-interactive broadcast systems such as radio or television and interactive computing systems such as the Web.

It is another object of the invention to enhance the information provided by broadcast program producers with an access to complementary information on the Web.

It is another object of the invention to provide a system and method for combining the user-friendly experience of radio and television with the huge amount of information and services available on the Web.

It is another object of the invention to enable a radio auditor or a television viewer to select topics that draw his interest from a conventional broadcast system and then to easily access information related to these topics in a Web environment.

It is a further object of the invention to enable a viewer to more conveniently access additional information related to broadcast programs, without transmitting additional information or modifying conventional broadcast signals and thus, without modifying conventional receivers or display equipment.

SUMMARY OF THE INVENTION

The present invention is directed to a system and method as defined in independent claims for enabling a radio auditor or a television viewer (100) to access complementary information (101) related to a broadcast program (102) received in real-time. The preferred embodiment of the invention relates to a system and method for enabling a person (100) receiving a broadcast program (102), to select a plurality of topics or sequences drawing his or her attention (101) (103) and for immediately, or at a later time, accessing additional information related to these topics or sequences from the Word Wide Web. The system is based on a synchronization of the local times of receivers and transmitters according to a same universal-time (201) (202), so that the flow of information transmitted and received is always synchronized, independently of the relative positions of receivers and transmitters. The synchronization is done referring to an universal time such as the Global Positioning System Time (GPS-time), the Global Orbiting Navigational Satellite System (GLONASS) time or another suitable universal time based on a satellite system.

The GPS or GLONASS receivers are connected or integrated to the broadcasting stations. At the receiver side, GPS or GLONASS receivers may be integrated or connected to devices (e.g., Personal Computers, wearable computers, Personal Digital Assistants (PDAs), smart phones or onboard mobile computers) that may be independent or separate from the radio or television receivers. The system is also based on a plurality of hyperlinks defined for given intervals of universal-time during the broadcasting. The hyperlinks are associated with the transmitted information. The hyperlinks can be retrieved, selected and activated by radio auditors or television viewers during the time intervals for which they have been defined.

Further embodiments of the invention are provided in the appended dependent claims.

More particularly, the present invention discloses also a system, method and computer program for use in a user device connected to a network, of retrieving in real time hyperlinks related to topics selected in a program broadcast on a channel. The method comprises the steps of:

- each time a selection command is received, determining by means of an universal-time device, the universal time corresponding to the reception of said selection command;
- accessing in a server connected to the network, information related to the one or plurality of hyperlinks defined in the broadcast program, said information comprising for each hyperlink:
  - a destination address within the network for accessing multimedia information;
  - an universal time interval during which it is possible to retrieve a destination address associated with the hyperlink when the program is broadcast on the channel;
- retrieving from the accessed server, the destination address associated with each hyperlink defined for the one or plurality of time intervals comprising said universal-time;
- storing locally the one or plurality of retrieved destination addresses.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows how a user perceives topics of interest when listening or viewing radio or television programs.

FIG. 2 illustrates the principle of the invention based on the synchronization of the local time of transmitters and receivers according to a same universal time, such as for example, the Global Positioning System (GPS) time.

FIG. 3 shows the main components of the invention.

FIG. 4 shows how universal-times corresponding to interesting topics of a program are selected by a radio auditor or a television viewer and recorded in the user device in an Universal-Time Table corresponding to the selected broadcast channel according to the present invention.

FIG. 5 shows how the user device sends to the Channel Information Server the universal-times recorded in the Universal-Time Table of the selected broadcast channel according to the present invention.

FIG. 6 shows how the names and URL's of hyperlinks that can be activated at selected universal-times can be retrieved from the Channel Information Server according to the present invention.

FIG. 7 shows how, each time an universal-time is recorded, the Universal-Time Table of the selected broadcast channel is updated in the user device with the names and destination addresses (URLs) of the hyperlinks retrieved from the Channel Information Server according to the present invention.

FIG. 8 shows how the user selects and activates an hyperlink from the updated Universal-Time Table according to the present invention.

FIG. 9 shows how an hyperlink is activated and how the corresponding multimedia information or service is retrieved from the Web and displayed on the user device according to the present invention.

FIG. 10 illustrates how the programs retransmitted by a broadcasting station are synchronized according to the present invention.

FIG. 11 illustrates how hyperlinks of a program become alive during the transmission of said program, and how several hyperlinks can be alive at the same universal-time according to the present invention.

FIG. 12 shows how different hyperlinks can be selected by an auditor or viewer at different universal-times, and how a plurality of hyperlinks can be selected by the auditor or viewer at the same universal-time during the reception of the broadcast program according to the present invention.

FIG. 13 shows how the hyperlinks (i.e., hyperlinked sequences) and the corresponding time intervals are stored in a Program Timing File of a recorded program according to the present invention.

FIG. 14 shows an example of a Program Timing File of a recorded program according to the present invention.

FIG. 15 illustrates the steps of the method for creating Program Timing Files on Channel Information Servers according to the present invention.

FIG. 16 illustrates the steps of the method of generating an Hyperlink Table on a Channel Information server using the Program Timing File when a recorded program is broadcast according to the present invention.

FIG. 17 shows how relative time intervals of the hyperlinks referenced in the Program Timing File of a recorded program are transformed in absolute time intervals (also called universal-time intervals) in the Hyperlink Table when the recorded program is broadcast according to the present invention.

FIG. 18 shows the Hyperlink Table of the retransmitted program in the Channel Information Server according to the present invention.

FIG. 19 illustrates the steps of the method for selecting interesting topics in a program according to the present invention.

FIG. 20 illustrates the steps of the method for accessing the information related to selected topics according to the present invention.

PREFERRED EMBODIMENT OF THE INVENTION

As shown in FIGS. 1 and 2, the present invention discloses a system and a method for enabling a radio auditor or a television viewer (100) to access additional information (103) related to a program (101) retransmitted from a radio or television broadcasting station (102). The principle is to synchronize the local time of transmitters (201) and receivers (202) according to a same universal time, such as for example, the Universal Time Co-ordinated (UTC) or the Global Positioning System (GPS) time.

As shown in FIG. 3, the preferred embodiment of the invention provides a system and a method for enabling a person (301) receiving a broadcast program (302), to select (303) a plurality of topics (304) drawing his or her attention and for immediately, or at a later time, accessing additional information related to these topics from the Word Wide Web. The flow of information that is transmitted and received (302) is synchronized according to an universal time (305) (306) such as the Global Positioning System Time (GPS-time), the Global Orbiting Navigational. Satellite System (GLONASS) time or another suitable universal time based on a satellite system. The GPS or GLONASS receivers (305) are integrated or connected to the broadcasting stations or transmitters (307). At the receiver side, GPS or GLONASS receivers (306) may be integrated or connected to user devices (308), (e.g., Personal Computers, wearable computers, Personal Digital Assistants (PDAs), smart phones or onboard mobile computers) that may be independent or separate from the radio or television receivers (314). FIG. 10 shows that the invention is based on a system in which programs (1001) are broadcast according to a universal time. FIGS. 11 and 12 shows how the broadcast information (1101) and hyperlinks (1102) are associated and how, when transmitters and receivers are synchronized, the hyperlinks can be selected by radio auditors or television viewers during some time intervals (1103) of transmission defined (1102) beforehand. FIG. 12 also shows how a plurality of hyperlinks can be selected at the same time (1104, 1105, 1201)).

During transmission of a program, the broadcasting station or transmitter (307) updates a database on a Channel Information Server (309) (i.e., a server linked to the transmitter). This database comprises universal time intervals (1103) (for instance GPS-time intervals) during which hyperlinks (1102) between the broadcast program (1101) and URLs (Uniform Resource Locators) of Web pages are "alive" and can be retrieved by radio auditors or television viewers. During reception of a broadcast program (302), an auditor or viewer (301) can select (303) one or a plurality of interesting topics (304) by recording in an Universal-Time Table (311) the times (1201) corresponding to the perception (audition or view) of said topics. The Universal-Time Table (311) is located at the receiver side in a device (308) synchronized with the transmitter (307) according to an universal time (306) (305) (for instance the GPS-time). The auditor or viewer (301) sends from the Universal-Time Table (311) to the Channel Information Server (309) the recorded times (1201) corresponding to the selections that have been made on the user's device (308). The Channel Information Server (309) searches into its database the hyperlinks GPS-time intervals (1103) and identifies the hyperlinks (1104) (1105) associated with selected GPS-times. The Channel Information Server (309) replies to the user device (308) by sending back the Web page addresses (i.e., the URLs), and optionally the description of the hyperlinks (1104) (1105) that were alive at the selection times (1201). The radio auditor or television viewer (301) can select (303) and activate anyone of these hyperlinks using a Web browser (310) and can receive from the Web (312) the information or service related to the selected topics.

Since the present invention does not require any physical connection between the receiver of the broadcast program (e.g., a TV set, a car radio) and the user device (e.g., a PDA w/GPS, a smart phone w/GPS) that carries out the invention on the auditor or viewer 's side, and since this user device is in fact fully independent:

The system and method according to the present invention does not impose any particular modification on the broadcasting station, the transmitted signal or receiver. That means that the invention is fully compatible with the many broadcast systems and receivers that are in use today and that will be in use in the future!

Moreover, the system and method according to the present invention can be used by anyone. Its use is not reserved and limited to owners of the receiver apparatus. A user can be for instance, a person watching a TV program while taking a drink in a cafeteria!. This user can select one or a plurality of topics in the cafeteria. He can later on select other topics from another program while doing shopping. When he comes back to his house, he can seat in front of his PC and can retrieve from the Web, the information related with the topics he has previously selected.

It is important to notice that, compared with the present invention, WebTV or interactive Internet TV are rather different concepts. Since the interaction between the user and the WebTV must be "immediate" or "direct", the user must be the "owner" of the WebTV set. For this reason, WebTV cannot be used by anybody seating in a cafeteria (without disturbing the other people watching the television!).

Universal Timing Systems

Timing sequences, independent of locations of transmitters and receivers, can be derived from an absolute timing reference such as, for example, the Global Positioning System (GPS) time or the Universal Time Co-ordinated (UTC) time (also known today as GMT and ZULU time).

To transmit precise timing signals, the GPS uses 24 satellites in 55° inclined orbits 10,000 miles above the earth. These timing signals are used by any GPS receiver anywhere on the earth to determine its position. A 1575 MHz transmission carries a 1-MHz bandwidth phase-modulated signal named the clear acquisition (C/A) code. When a GPS receiver receives this signal from at least three GPS satellites, it can determine its own latitude and longitude with an accuracy of about 30 meters. Apart from the determination of geographical positions, the GPS is today widely used for distributing Precise Time and Time Interval (PTTI). The system uses time of arrival (TOA) measurements for determining a position. A precisely timed clock is not essential for the user because time is obtained in addition to position by the measurement of the TOA of four satellites simultaneously in view. If the altitude over sea level is known, three satellites are sufficient. If the user is stationary at a known position then, in principle, the time can be obtained by the observation of a single satellite. Information about the GPS time service is supplied by the "Time Service Department", U.S. Naval Observatory, Washington, DC, at: tycho.usno.navy.mil/.

GPS is today the world's principal supplier of accurate time. It is used extensively both as a source of time and as a means of transferring time from one location to another. Three kinds of time are available from GPS: GPS time, UTC as estimated and produced by the United States Naval Observatory, and the times from each free-running GPS satellite's atomic clock. The Master Control Station (MCS) at Falcon Air Force Base near Colorado Springs, Colo., gathers the GPS satellites' data from five monitor stations around the world. A Kalman filter software program estimates the time error, frequency error, frequency drift and Keplerian orbit parameters for each of the satellites and its operating clock.

This information is uploaded to each satellite so that it can be broadcasted in real time. This process provides GPS time consistency across the constellation to within a small number of nanoseconds and accurate position determination of the satellites to within a few meters.

The second universal time standard, Universal Time Co-ordinated (UTC), introduces leap seconds to remain synchronized with the rotation of the earth. In order to provide an estimate of UTC time derivable from a GPS signal, a set of UTC corrections is also provided as part of the GPS broadcast signal. This broadcast message includes the time difference in whole seconds between GPS time and UTC. This complicates software that deals with the smooth flow of data streams or calculates the times between data samples. GPS Time is preferred in this invention as this system avoids the introduction of leap seconds and is easily related to UTC. Information about UTC (GMT) time service can be found on: time.greenwich2000.com/.

GPS Receivers

A Direct-to-Digital GPS Receiver is described in the following Web site: w3.research.ibm.com/present/gto200038.htm. This is an example of a tiny low cost chip which can integrate GPS into anything (e.g., a PDA, a mobile phone, a wearable computer, a video camera). This receiver has been jointly developed between IBM and Leica. The high speed analog capabilities of SiGe technology, when integrated with the CMOS technology, allows the integration of this single chip directly to a digital GPS (Global Positioning System) receiver. GPS derived position information is finding a multitude of diverse applications: from mapping and surveying to vehicle tracking to 911 cell phone caller location to automated farm equipment to even robotics golf carts... This receiver chip reduces the radio dimensions and complexity. There are no analog mixer stages, nor costly discrete components (such as high quality filters) that conventional two stage analog down conversion would have required. Instead, the incoming GPS signal is literally digitized right at the antenna, then filtered digitally in a CMOS based chip. This direct digitization is made possible by the ability of SiGe technology to run at high speed on very little power, and the core of this technology is a SiGe based Analog to Digital Data Converter.

According to the present invention GPS or GLONASS receivers must be integrated or connected to user's devices (e.g., Personal Computers, wearable computers, Personal Digital Assistants (PDAs), smart phones or onboard mobile computers). The universal timing signals that are received from GPS or GLONASS satellites, are used to initialize and synchronize the internal electronic clocking systems on the user's devices according to the same universal time. During the periods on which GPS or GLONASS satellites are out of sight (e.g., when user's devices are inside buildings or not connected to an external antenna), and no timing signals are thus received from those satellites, timing information must be continuously derived from the autonomous electronic clocking systems of the user's devices. Depending on the drift of the clocking systems set up in the user's devices, and to keep enough timing precision and to be sure that user's devices are synchronized with broadcasting stations at the same universal time, a more or less frequent periodic reception of satellite signals must be performed. In practice, if the user device is a portable or in-vehicle mounted device, satellite signals will be received when the user is out of doors or is traveling.

If the user device is fixed or installed in a house or building during long periods, the user device must be connected to an outdoors installed GPS or GLONASS antenna, (e.g., antenna installed on the roof of the building).

Time Stamping Multimedia Data into Programs

Time stamps (1301) are commonly used to encode multimedia timing information embedded with audio and video streams (1300). Also, time stamps on program data streams enable time information to be associated with events on audio, video or other time dependent data to broadcast. Time stamps are used within current video tape formats and DAT formats (files *.DAT are plain text-ASCII-files that represent digital signals).

Commonly stamps embedded in a multimedia data stream are used to meter the playback rate to be sure that the stream runs at the desired rate. Also, during production or edition of programs, if several streams are independently recorded (e.g., video and audio), and need to be edited, to be integrated on a unique stream, then certain operations such as cuts or insertions may be required at certain recorded times on each stream. The use of time stamps (also named "mark keys") embedded in multimedia streams provides markers for controlling such operations.

In fact, time coding is a fundamental aspect of the today post-production world. In simple terms, a time code is a number assigned to each video frame, so that each frame can be uniquely identified. In some systems, the data is coded in binary-coded decimal digits in the form HH:MM:SS:FF (hours:minutes:seconds frames). In video post-production, an edit is denoted by an "in" point (the time code of the first frame to be recorded) and an "out" point (the time code of the first frame beyond the recording).

A system for time coding multimedia streams is provided by Aaton, a company with headquarters in Grenoble, France, and an innovator of motion-picture camera equipment. When using camera equipped with Aaton time-code electronics and an audio time-code recorder and related hardware, a true time and date is recorded. A unique stamp or code (AatonCode) is attached permanently to the image and sound originals. The non-repeatability of the code makes possible the association of a single piece of audio with a particular image. In post-production, the Aaton's system is used as a film-code reader, transfer database and management system for the telecine. The post-production reads the codes off the negative during film-to-tape transfer and translates the data from each film frame to a field of video into a frame-accurate description. By reading this real-time address and simultaneously feeding its audio time-code equivalent to an audio-chasing machine, the system can perform nonstop automatic synchronizing of a DAT or quarter-inch field audio during the transfer. In post-production, the use of AatonCode and the associated database reduces event-logging time for the editor's assistant. Information about the Aaton's post-production system and products can be found on the official page at: www.aaton.com.

By means of the here above described systems or by anyone of several other systems today in use for the post-production of multimedia data, the timing information (e.g., time stamps) of a recorded program (1300) can therefore be used to encode and record time intervals (1301) in a Program Timing File (1302). According to the present invention, the Program Timing File of a recorded program comprises timing information (for instance, times elapsed relative to the program's start time (t=0) (1304)) related to different sequences of the program.

Hyperlinked Time Intervals

An hyperlinked word (or image) in an HTML document can be defined as a range of letters (or pixels) that can be activated with a pointing device to access a Web page. For information transmitted as a real-time sequence of items, the concept of "hyperlinked time interval" is similar to the concept of hyperlinked word or image. The present invention defines for a particular radio or television program hyperlinks (1305) related to specific time intervals (1301). Each hyperlink can be activated during the time interval for which said hyperlink is defined.

To that aim the system uses the Program Timing File (1302) of a recorded program (1300), such as a CD, DVDs or a video or audio cassette to be broadcast for storing the different hyperlinked time intervals (1301) comprised in the radio or television program. The hyperlinked time intervals associate time intervals (t_init, t_end) (1301) with multimedia information or services located on servers accessible through the Internet or through another network.

Program Timing File

Embodiments of the present invention are described herein with reference to URLs an/or hyperlinks. In describing embodiments of the present invention, the URLs and/or hyperlinks, the "http" portion of the URL and/or hyperlink has been replaced with "xyyz". Thus, occurrences of the letters "xyyz" may be replaced with "http" to provide a functional URL and/or hyperlink. Furthermore, numeric values are stated utilizing the European convention of "." separators rather than "," separators. Thus, for example, a recitation of 4,587 seconds is recited as 4.587 seconds.

In the preferred embodiment of the invention, hyperlinked time intervals (1301) are encoded in the Program Timing File (1302) in relative time units, such as seconds, elapsed from the beginning of the program (t=0) (1304). Thus, for each hyperlink (1305) (e.g., hyperlink 6) "t_init" indicates the number of seconds elapsed from the time at which the program starts to play (t=0) to the time at which the hyperlink becomes active (and can be retrieved by the auditor or viewer), and "t_end" indicates the number of seconds elapsed from the time at which program starts to play (t=0) to the time at which the hyperlink is no more alive. FIG. 13 also shows how time intervals (1301) associated with the different hyperlinks (1305) may overlap and hence how several hyperlinks may be alive simultaneously.

The Program Timing File of a post-produced program encodes, for each hyperlink:
 the hyperlink time interval (t_init, t_end), in time units relative to the star of the program,
 the hyperlink name or short description, and
 the hyperlink destination address (i.e., the URL) where the hyperlinked information or service can be found.

FIG. 14 is an example (also shown in the next table) of the Program Timing File (1401) for a television program entitled "Early British Kingdoms" (808). This program has a duration of 4.587 seconds (1402). This file teaches that, for example, the hyperlink named "Ceredigion" (1403) can be activated 1.535 seconds (1404) after the program starts and can be activated until second 2.092 (1405). If a user selects a program at any moment during this (relative) time interval, the hyperlink to the URL address (1406):
 xyyz://freespace.virgin.net/david.ford2/ceredigion.html will be selected. This example also shows that if, for instance, a user selects a topic 1.790 seconds after the program starts playback, then hyperlinks:
 "Ceredigion" at URL:xyyz://freespace.virgin.net/david. ford2/ceredigion.html and "Mabinogion" at URL:
 xyyz://www.cyberphile.co.uk/~taff/taffnet/mabinogion/ mabinogion.htm will both be selected.

| PROG. TIME 4.587 segs. From (secs): | To (secs): | PROGRAM NAME: "Early British Kingdoms" Link Name: | PROGRAM URL: xyyz://freespace.virgin.net/ URL: |
|---|---|---|---|
| 0 | 596 | Buellt & Gwerthrynion | xyyz://freespace.virgin.net/david.ford 2/buellt.html |
| 536 | 721 | Caer-Baddan (Bath) | xyyz://freespace.virgin.net/david.ford 2/south.html#Gloui |
| 566 | 1 715 | Caer-Celemion (Silchester) | xyyz://freespace.virgin.net/david.ford 2/vortigern.html |
| 1 535 | 2 092 | Ceredigion | xyyz://freespace.virgin.net/david.ford 2/ceredigion.html |
| 1 535 | 2 452 | Mabinogion | xyyz://www.cyberphile.co.uk/~taff/taff net/mabinogion/mabinogion.htm |
| 2 392 | 3 597 | Avalon | xyyz://freespace.virgin.net/david.ford 2/avalon.html |
| 3 537 | 4 037 | Afallach | xyyz://freespace.virgin.net/david.ford 2/gods.html#Afallach |
| 3 720 | 3 973 | Beli Mawr | xyyz://freespace.virgin.net/david.ford 2/gods.html#Beli |
| 3 720 | 3 973 | St. Joseph of Arimathea | xyyz://freespace.virgin.net/david.ford 2/joseph.html |
| 3 840 | 4 259 | The Kings of Dumnonia | xyyz://freespace.virgin.net/david.ford 2/dumnonia.html |
| 4 199 | 4 587 | Eudaf Hen & Conan Mer | xyyz://freespace.virgin.net/david.ford 2/eudanc.html |

Method for Creating Program Timing Files on Servers

As shown in FIG. 15, the invention discloses a method for creating a Program Timing File for a post-produced program and for defining in this Program Timing File, hyperlinks between this program (1300) (like the TV movie entitled "Early British Kingdoms"), and one or a plurality of servers (312) (i.e., Web servers) connected to a network (313) (i.e., to the Internet Network). These hyperlinks will be used by the radio auditor or the television viewer (301) to access on these servers, multimedia information or services (i.e., Web pages) related to said program. The method comprises the steps of:

during the production or edition of the program (1300):
- (1501) selecting one or a plurality of relevant topics or subjects (1407) for which hyperlinks (1404) must be created;
- (1502) creating a Program Timing File (1401) for the program;
- defining hyperlinks in the Program Timing File between the selected topics (1407) and multimedia information or services located on one or a plurality of servers connected to a network, said step comprising the further steps of:
  for each one of the selected topics or subjects (1403):
  - (1503) assigning a name or a description (1403) (preferably a brief description);
  - (1504) assigning a destination address (1406) (for instance the URL) within the network (313) to access the desired multimedia information or service;
  - (1505) assigning a time interval (t_init, t_end) (1404) (1405), preferably in time units (e.g., seconds) elapsed from the program start time (t=0), during which it will be possible to retrieve and activate the hyperlink;
  - (1506) storing in the Program Timing File (1401) the assigned name (or description) (1403), the destination address (1406) and the hyperlink time interval (1404) (1405).

once hyperlinks have been defined in the Program Timing File:
- (1507) storing the Program Timing File (1401) in the Channel Information Server (309) of the broadcasting station (307).

Method for Generating Hyperlink Tables from Program Timing Files

As shown in the method on FIG. 16, when a program is retransmitted on a channel by a broadcasting station (307), the relative time-intervals (1404) (1405) of hyperlinks (1406) comprised in the Program Timing File (1401) on the Channel Information Server (309) are transformed in absolute time intervals (or universal-time intervals) using an universal-time provided by a GPS receiver (305) or by any other suitable universal-time device integrated or connected to the broadcasting station (307). The resulting table called Hyperlink Table, is then stored in a database on the Channel Information Server (309) so that it can be accessed by the auditors and viewers (301) receiving the broadcast program (302). The method of creating an Hyperlink table in the Channel Information Server comprises the step of transforming the relative time intervals of the hyperlinks comprised in the Program Timing File into absolute time intervals when a recorded program is broadcast. More particularly the method comprises the steps of:

- (1601) retrieving the Program Timing File (1401) of the recorded program to be transmitted;
- (1602) determining by means of an universal-time device (305) (e.g., a GPS receiver) integrated or connected to the broadcasting station (307), the universal time (date and time) corresponding to the start of the program transmission;
- (1603) computing absolute time intervals (universal-time intervals) by adding to the (relative) time-intervals (1404) (1405) of hyperlinks comprised in the Program Timing File (1401), the universal time corresponding to the start of the program transmission;
- (1604) storing the resulting Hyperlink Table in a database accessible, in the Channel Information Server (309), by the auditors or viewers of the program. In a preferred embodiment, the Channel Information Server comprises the Program Timing Files and the Hyperlink Tables of all hyperlinked programs broadcast on the channel;
- (1605) broadcasting the program (302).

FIG. 17 illustrates how, by means of the present method when the transmission starts, the relative time intervals associated with the hyperlinks in the Program Timing File are transformed to universal-time intervals (absolute time intervals) in the Hyperlink Table.

The following table, also shown in FIG. 18, shows the Hyperlink Table that is generated on the Channel Information Server (309) from the Program Timing File shown in FIG. 14 (and on the herein above table), when the broadcasting station starts the transmission of the movie entitled "Early British Kingdoms" at universal-time (1803): Dec. 5, 2000 14:10:51.

| From: | To: | PROGRAM NAME: "Early British Kingdoms" Link Name: | PROGRAM URL: xyyz://freespace.virgin.net/ URL: |
|---|---|---|---|
| Dec. 05, 2000 14:10:51 | Dec. 05, 2000 14:20:05 | Buellt & Gwerthrynion | xyyz://freespace.virgin.net/david.ford2/buellt.html |
| Dec. 05, 2000 14:19:05 | Dec. 05, 2000 14:22:52 | Caer-Baddan (Bath) | xyyz://freespace.virgin.net/david.ford2/south.html#Gloui |
| Dec. 05, 2000 14:20:17 | Dec. 05, 2000 14:39:26 | Caer-Celemion (Silchester) | xyyz://freespace.virgin.net/david.ford2/vortigern.html |
| Dec. 05, 2000 14:36:26 | Dec. 05, 2000 14:45:43 | Ceredigion | xyyz://freespace.virgin.net/david.ford2/ceredigion.html |
| Dec. 05, 2000 14:36:26 | Dec. 05, 2000 14:51:43 | Mabinogion | xyyz://www.cyberphile.co.uk/~taff/taffnet/mabinogion/mabinogion.htm |
| Dec. 05, 2000 14:50:43 | Dec. 05, 2000 15:10:48 | Avalon | xyyz://freespace.virgin.net/david.ford2/avalon.html |
| Dec. 05, 2000 15:09:48 | Dec. 05, 2000 15:18:08 | Afallach | xyyz://freespace.virgin.net/david.ford2/gods.html#Afallach |

-continued

| From: | To: | PROGRAM NAME: "Early British Kingdoms" Link Name: | PROGRAM URL: xyyz://freespace.virgin.net/ URL: |
|---|---|---|---|
| Dec. 05, 2000 15:12:51 | Dec. 05, 2000 15:16:22 | Beli Mawr | xyyz://freespace.virgin.net/david.ford2/ gods.html#Beli |
| Dec. 05, 2000 15:12:51 | Dec. 05, 2000 15:16:22 | St. Joseph of Arimathea | xyyz://freespace.virgin.net/david.ford2/ joseph.html |
| Dec. 05, 2000 15:14:51 | Dec. 05, 2000 15:20:08 | The Kings of Dumnonia | xyyz://freespace.virgin.net/david.ford2/ dumnonia.html |
| Dec. 05, 2000 15:19:08 | Dec. 05, 2000 15:25:36 | Eudaf Hen & Conan Mer | xyyz://freespace.virgin.net/david.ford2/ eudanc.html |

Method for Selecting Topics of Interest

When a person (301) listens or watches a broadcast program (for example, a TV program entitled "Early British Kingdoms") (304), some topics may draw his attention. The person may wish to obtain complementary information concerning these topics. FIG. 19 shows a method for selecting one or a plurality of topics of interest for the purposes of immediately, or at a later time, receiving further information related to these topics. The information is retrieved from on one or a plurality of servers (312) connected to the network (313) (e.g., from the Word Wide Web) using a user device (308) connected to a universal-time receiver (306) (e.g., a GPS-time receiver).

As a preliminary step for enabling the user (301) to select topics of interest (304) from programs received from different channels (307), a Channel Table, like the one illustrated hereinafter, must be created beforehand on the user device and must be filled with the information pertaining to all channels that the user knows to be usable to implement the system and method of the invention. Basically, a Channel Table stores the information needed for accessing the user device (308) to a plurality of Channel Information Servers (309) throughout the communications network (313). This table comprises a list of channel numbers and, for each channel number, the broadcasting station name and the network address (for instance the URL) the Channel Information Server associated with said channel. The information on the Channel Table has been previously recorded by the user and can be provided by anyone of the many today available information sources (e.g., by the same TV or radio operators, from newspapers, the Web, . . . ).

| CHANNEL: | BROADCAST STATION: | CHANNEL INFORMATION SERVER URL: |
|---|---|---|
| 03 | RNF | xyyz://www.radio_nf_info.com |
| 25 | TV2 | xyyz://www.tve2_link.com |
| 17 | TV5 | xyyz://www.tve5_link.com |
| 33 | CNN-NEWS | xyyz://www.cnn_news_link.com |
| 72 | NBC | xyyz://www.nbc_link.com |

To select topics of interest, the auditor or viewer of a broadcast program:

(1901) selects a broadcast channel (302) on the receiver apparatus (for instance radio or television set) (314);
(1902) identifies the selected broadcast channel (302);
(1903) enters on a user device (308), the identification of the broadcast channel (302), (e.g., channel "25"). This action creates (1904) the Universal-Time Table (311) (401) associated with selected broadcast channel (302), said Universal-Time Table comprising information concerning said broadcast channel including the identification of the selected broadcast channel (402), the address (for instance the URL) of the Channel Information Server associated with said broadcast channel (404) and, optionally, the name designating said broadcast channel (405). In a preferred embodiment, this information is extracted and copied from a Channel Table like the previously described Channel Table;

(1905) listens or watches the program transmitted on the selected broadcast channel (302);
(1906) perceives (listens or views) in the program a topic of interest (304) for which he desires additional information or service;
(1907) selects a topic by entering a selection command (303) on the user device (308);
(1908) determines current universal-time by means of an universal-time device (for instance a GPS receiver) (306) integrated or connected to the user device;
(1909) records this current universal-time in the Universal-Time Table (311) of the selected broadcast channel.

The following table, also shown in FIG. 4 is an example of Universal-Time Table (401) for a particular channel (402), where the universal-times (403) corresponding to the topics of interest (304) selected by the auditor or viewer on this channel (e.g., a television program entitled "Early British Kingdoms") have been recorded. The header of the Universal-Time Table shows the network address (i.e., the URL) (404) of the Channel Information Server (309) of the channel.

| CHANNEL: 25 SELECTION TIMES (GPS): | BROADCASTING STATION: TV2 LINK NAME: | CHANNEL INFORMATION SERVER URL: xyyz:/www.tve2_link.com LINK URL: |
|---|---|---|
| Dec. 05, 2000 14:21:52 | | |
| Dec. 05, 2000 15:09:03 | | |
| Dec. 05, 2000 15:17:34 | | |

Method for Retrieving Hyperlinks and for Accessing Information

Once the radio auditor or television viewer (301) has selected one or a plurality of topics of interest in a program (304) broadcast on a channel (302) (for example in a television program entitled "Early British Kingdoms") and once the universal-times (403) corresponding to these selected topics have been stored or recorded in the Universal-Time Table (311), (401) of the channel, by means of the method described in FIG. 20, the auditor or viewer can retrieve from the Channel Information Server (309) the hyperlinks associated with the selected topics. The retrieved hyperlinks are stored in the Universal-Time Table (311) stored in the user device (308). The auditor or viewer can select and activate (303) any retrieved hyperlinks to access the multimedia information or service related to the corresponding selected topic. This information or service is located on servers (312) connected to the network (313) (e.g., Internet Web servers). The method for the auditor or viewer of the program, comprises the steps of:

(2001) accessing from the user device (501), the Channel Information Server (502) of the selected broadcast channel (503);

for each universal-time (504) recorded on the Universal-Time Table (505) stored on the user device:

(2002) sending (501) to the Channel Information Server (502) the recorded universal-time (506);

(2003) searching in the Hyperlink Table (1801) stored in the Channel Information Server (502) for the one or plurality of hyperlinks (1804) that can be activated at said universal-time (the hyperlinks defined for the one or plurality of time intervals comprising said universal-time);

(2004) retrieving from the Hyperlink Table (1801) located in the Channel Information Server (502, 602) to the user device (601), the names (or descriptions) and destination addresses (URLs) (603) of the hyperlinks that can be activated (1804);

(2005) storing the retrieved one or plurality of hyperlinks names and destination addresses (URLs) into the corresponding entry (702) of the Universal-Time Table (701);

The method includes the further steps of:

(2006) selecting in the Universal-Time Table (802) an hyperlink using the hyperlink name (or description) or destination address retrieved from the Channel Information Server;

(2007) activating said hyperlink using (2008) a browser program (902) on the user device (901);

(2008) accessing the information and/or service located on a server (903) connected to the network (904) using the destination address retrieved with the selected hyperlink;

(2009) retrieving from the accessed server (903) on the network (904) and displaying this information and/or service (905) using the browser program (902) on the user device (901).

FIGS. 5, 6, 7, 8 and 9 illustrate the different steps according to the present method. FIG. 5 shows how a television viewer, after selecting on the Universal-Time Table (505) of a channel (503) (e.g., "Channel 25"), different universal-times (504) (e.g., Dec. 5, 2000 14:21:52; Dec. 5, 2000 15:09:03 and Dec. 5, 2000 15:17:34) corresponding to a set of interesting topics related to a broadcast program (e.g., a television program entitled "Early British Kingdoms"), sends the Universal-Time table (505) to the Channel Information Server (502). FIG. 6 shows how, the Channel Information Server (602) retrieves from the channel database and sends back to the user device (601) the information (603) related to the hyperlinks that were alive at the selected universal-times. FIG. 7 shows how the Universal-Time Table (701) is updated on the user device (601) with hyperlinks information (702) (i.e., the hyperlinks names and URLs corresponding to the universal-time intervals selected by the user). Note that a plurality of hyperlinks corresponding to a single selection may be retrieved from the Channel Information Server.

| CHANNEL: 25 SELECTION TIMES (GPS): | BROADCASTING STATION: TV2 LINK NAME: | CHANNEL INFORMATION SERVER URL: xyyz://www.tve2_link.com LINK URL: |
|---|---|---|
| Dec. 05, 2000 14:21:52 | Caer-Baddan (Bath) Caer-Celemion (Silchester) | xyyz://freespace.virgin.net/ david.ford2/south.html#Gloui xyyz://freespace.virgin.net/ david.ford2/vortigern.html |
| Dec. 05, 2000 15:09:03 | Avalon Afallach | xyyz://freespace.virgin.net/ david.ford2/avalon.html xyyz://freespace.virgin.net/ david.ford2/gods.html#Afallach |
| Dec. 05, 2000 15:17:34 | The Kings of Dumnonia | xyyz://freespace.virgin.net/ david.ford2/dumnonia.html |

Finally, FIGS. 8 and 9 show how a radio auditor or a television viewer thanks to the Universal-Time Table (802), can select one or a plurality of hyperlinks (803), access a server (804) (903) on the network (805) (904), preferably the Internet network, (FIG. 8), and receives the information or service from the accessed server (804) (903) on the network (FIG. 9). The retrieved information or service is finally displayed or played on the user device (801) (901) by means of a browser program.

While the invention has been particularly shown and described with reference to a preferred embodiment, it will be understood that various changes in form and detail may be made therein without departing from the spirit, and scope of the invention.

The invention claimed is:

1. A method of retrieving hyperlinks related to topics selected in a program broadcast on a channel, comprising:
   identifying the channel that is broadcasting the program;
   creating a universal-time table for the identified channel, the universal-time table comprising an identification of the channel, an address for accessing the information associated with the at least one hyperlink and/or a name designating the channel, being located at a receiver side on a user device;
   receiving a selection command of a topic relating to a broadcast program by recording in the universal-time table a time corresponding to perception of said topic;
   determining a universal time corresponding to receipt of the selection command, wherein the universal time is based on a universal timing system using a satellite based universal-time receiver;
   obtaining from a server over a network, information associated with at least one hyperlink defined in the broadcast program and having a universal time interval associated therewith that corresponds to the universal time of receipt of the selection command, the universal time interval based on a synchronization of a local time and the universal timing system, wherein the information comprises a destination address within the network for accessing multimedia information, the universal time interval indicating when the destination address is active for access to the multimedia information;
   storing the obtained destination address at the user device, wherein the local time is based on a location of the user device; and
   accessing the multimedia information utilizing the at least one hyperlink from the destination address within the indicated universal time interval.

2. The method of claim 1, wherein determining a universal time further comprises recoding the determined universal in the universal-time table of the channel.

3. The method of claim 1, wherein obtaining from a server over a network further comprises retrieving the address for accessing the information associated with the at least one hyperlink from the universal-time table and obtaining the information utilizing the retrieved address.

4. The method of claim 1, further comprising storing the obtained destination address in the universal-time table.

5. The method of claim 1, wherein the user device and the server are synchronized according to the same universal time.

6. The method of claim 1, wherein the user device and a device receiving the program are separate devices.

7. The method of claim 1, wherein the at least one hyperlink comprises a plurality of hyperlinks and wherein accessing multimedia information comprises:
  selecting a hyperlink from the plurality of hyperlinks; and
  retrieving the multimedia information on a server connected to the network using an obtained destination address associated with the selected hyperlink.

8. The method of claim 7, wherein selecting a hyperlink comprises selecting a hyperlink from a universal-time table using a name, description and/or obtained destination address associated with the hyperlink.

9. The method of claim 7, further comprising displaying the retrieved multimedia information on the user device.

10. The method of claim 1, wherein the network comprises an Internet Protocol network, the server comprises a web server, the user device comprises a web browser and the destination address comprises a universal resource locator.

11. The method of claim 1 wherein the network comprises an Internet Protocol network, the server comprises a web server, the user device comprises a web browser, the destination address comprises a universal resource locator and the multimedia information comprises a web page.

12. The method of claim 1 wherein the multimedia information comprise one or more services.

13. The method of claim 1, wherein a universal-time receiver is integrated with the user device.

14. A system for retrieving hyperlinks related to topics selected in a program broadcast on a channel, comprising:
  means for identifying the channel that is broadcasting the program;
  means for creating a universal-time table for the identified channel, the universal-time table comprising an identification of the channel, an address for accessing the information associated with the at least one hyperlink and/or a name designating the channel, being located at a receiver side on a user device;
  means for receiving a selection command of a topic relating to a broadcast program by recording in the universal-time table a time corresponding to perception of said topic;
  means for determining a universal time corresponding to receipt of the selection command, wherein the universal time is based on a universal timing system using a satellite based universal-time receiver;
  means for obtaining from a server over a network, information associated with at least one hyperlink defined in the broadcast program and having a universal time interval associated therewith that corresponds to the universal time of receipt of the selection command, the universal time interval based on a synchronization of a local time and the universal timing system, wherein the information comprises a destination address within the network for accessing multimedia information, the universal time interval indicating when the destination address is active for access to the multimedia information;
  means for storing the obtained destination address at the user device, wherein the local time is based on a location of the user device; and
  means for accessing the multimedia information utilizing the at least one hyperlink from the destination address within the indicated universal time interval.

15. A computer program product for retrieving hyperlinks related to topics selected in a program broadcast on a channel, comprising:
  a computer readable storage medium having computer readable program code embodied therein, the computer readable program code comprising:
  computer readable program code configured to identify the channel that is broadcasting the program;
  computer readable program code configured to create a universal-time table for the identified channel, the universal-time table comprising an identification of the channel, an address for accessing the information associated with the at least one hyperlink and/or a name designating the channel, being located at a receiver side on a user device;
  computer readable program code configured to receive a selection command of a topic relating to a broadcast program by recording in the universal-time table a time corresponding to perception of said topic;
  computer readable program code configured to determine a universal time corresponding to receipt of the selection command, wherein the universal time is based on a universal timing system using a satellite based universal-time receiver;
  computer readable program code configured to obtain from a server over a network, information associated with at least one hyperlink defined in the broadcast program and having a universal time interval associated therewith that corresponds to the universal time of receipt of the selection command, the universal time interval based on a synchronization of a local time and the universal timing system, wherein the information comprises a destination address within the network for accessing multimedia information, the universal time interval indicating when the destination address is active for access to the multimedia information;
  computer readable program code configured to store the obtained destination address at the user device, wherein the local time is based on a location of the user device and
  computer readable program code configured to access the multimedia information utilizing the at least one hyperlink from the destination address within the indicated universal time interval.

* * * * *